United States Patent
Lee et al.

(10) Patent No.: US 8,856,402 B2
(45) Date of Patent: Oct. 7, 2014

(54) METHOD AND APPARATUS FOR MULTIPLEXING AND DEMULTIPLEXING DATA TRANSMITTED AND RECEIVED BY USING AUDIO/VIDEO INTERFACE

(75) Inventors: Jae-min Lee, Suwon-si (KR); Il-ju Na, Yongin-si (KR); Seung-hwan Kim, Seoul (KR); Seung-kwon Park, Yongin-si (KR); Bong-hwan Cho, Suwon-si (KR); Harkirat Singh, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 13/213,853

(22) Filed: Aug. 19, 2011

(65) Prior Publication Data

US 2012/0044425 A1    Feb. 23, 2012

Related U.S. Application Data

(60) Provisional application No. 61/375,433, filed on Aug. 20, 2010.

(30) Foreign Application Priority Data

Jul. 20, 2011    (KR) .................. 10-2011-0072079

(51) Int. Cl.
*G06F 3/00* (2006.01)
*G06F 5/00* (2006.01)
*H04N 21/436* (2011.01)
*H04L 12/28* (2006.01)
*H04N 21/4363* (2011.01)

(52) U.S. Cl.
CPC ... *H04N 21/43632* (2013.01); *H04N 21/43615* (2013.01); *H04L 12/2838* (2013.01)
USPC .................................................. 710/36; 71/21

(58) Field of Classification Search
None
See application file for complete search history.

(56) References Cited

U.S. PATENT DOCUMENTS

| | | |
|---|---|---|
| 2006/0253615 A1 | 11/2006 | Flach et al. |
| 2007/0171811 A1 | 7/2007 | Lee et al. |
| 2009/0013095 A1 | 1/2009 | Butcher |
| 2009/0182917 A1 | 7/2009 | Kim |
| 2010/0037283 A1* | 2/2010 | Zhu .............................. 725/135 |
| 2010/0150007 A1 | 6/2010 | Jung et al. |
| 2011/0157310 A1 | 6/2011 | Mitani et al. |

FOREIGN PATENT DOCUMENTS

| | | |
|---|---|---|
| WO | 2007108602 A1 | 9/2007 |
| WO | 2010/026737 A1 | 3/2010 |

OTHER PUBLICATIONS

Communication dated Dec. 4, 2013, issued by the European Patent Office in counterpart European Application No. 11818428.2.

* cited by examiner

*Primary Examiner* — Zachary K Huson
(74) *Attorney, Agent, or Firm* — Sughrue Mion, PLLC

(57) ABSTRACT

A method and apparatus for multiplexing a plurality of streams transmitted and received via an audio/video (AV) link by allocating to the plurality of streams a plurality of basic units included in a transmission unit, and generating and transmitting an additional plurality of transmission units.

22 Claims, 17 Drawing Sheets

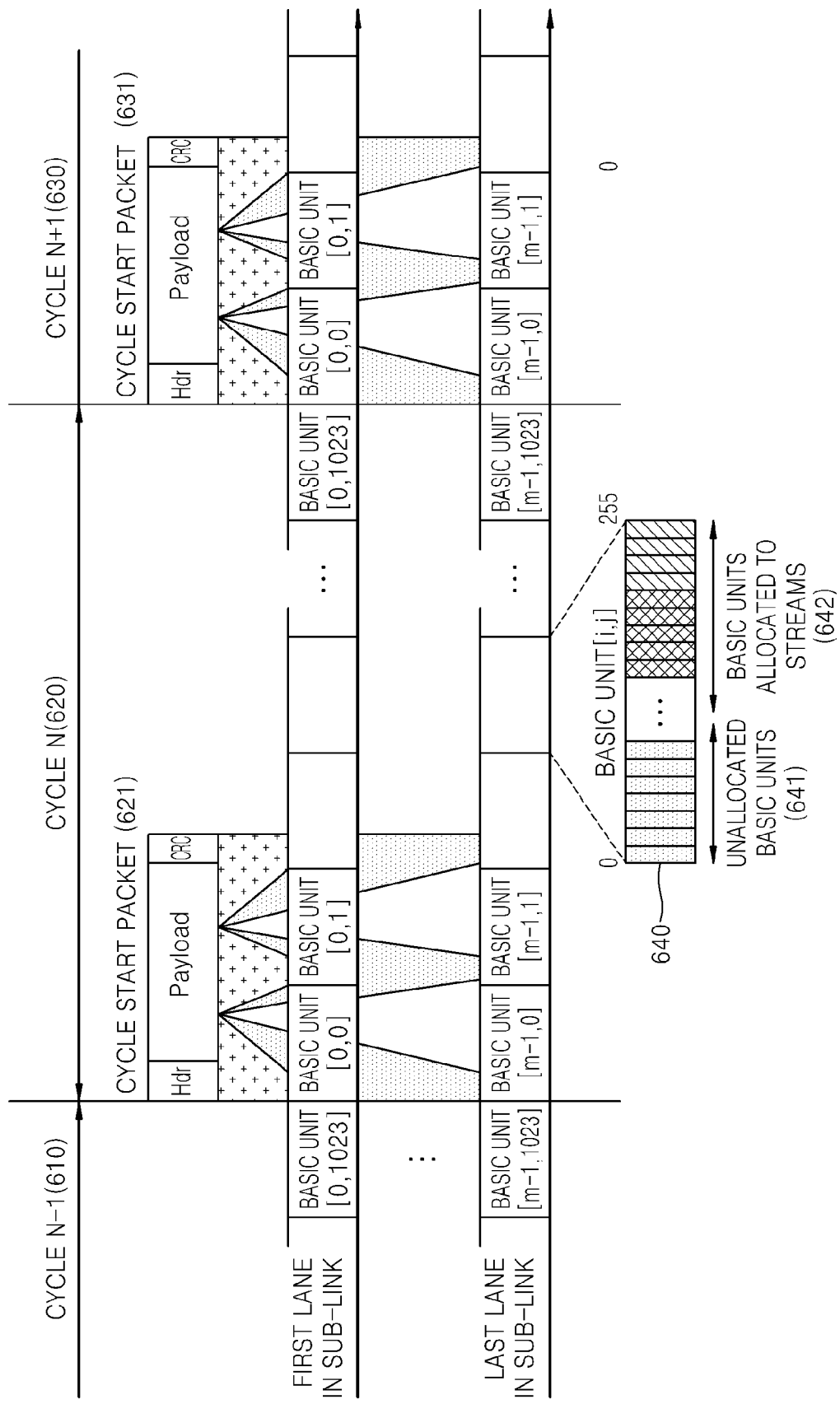

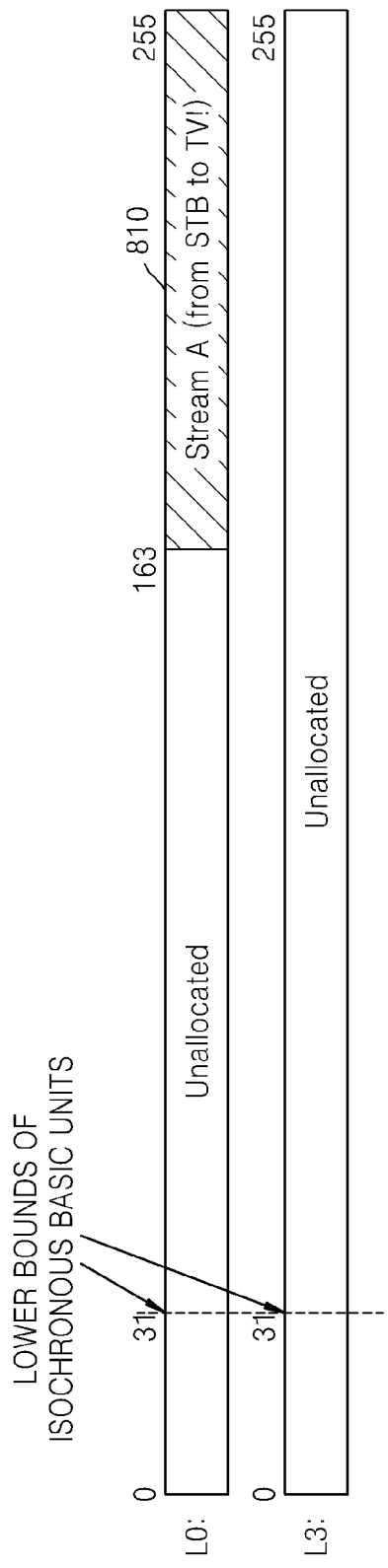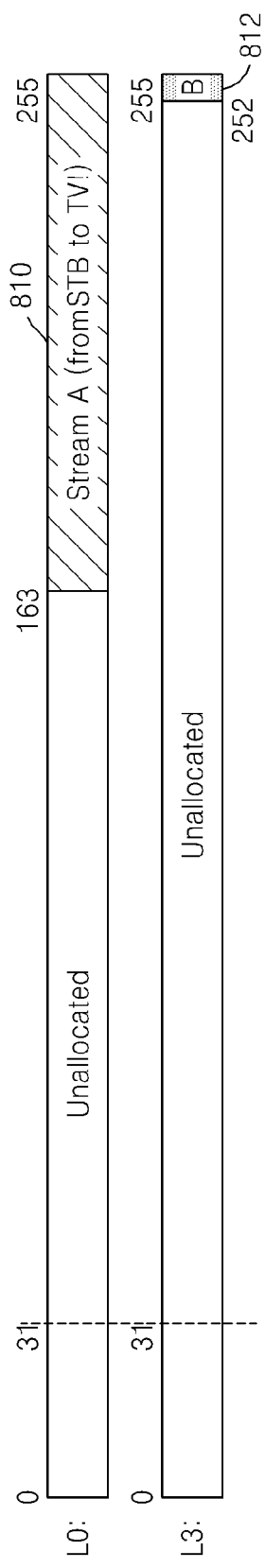

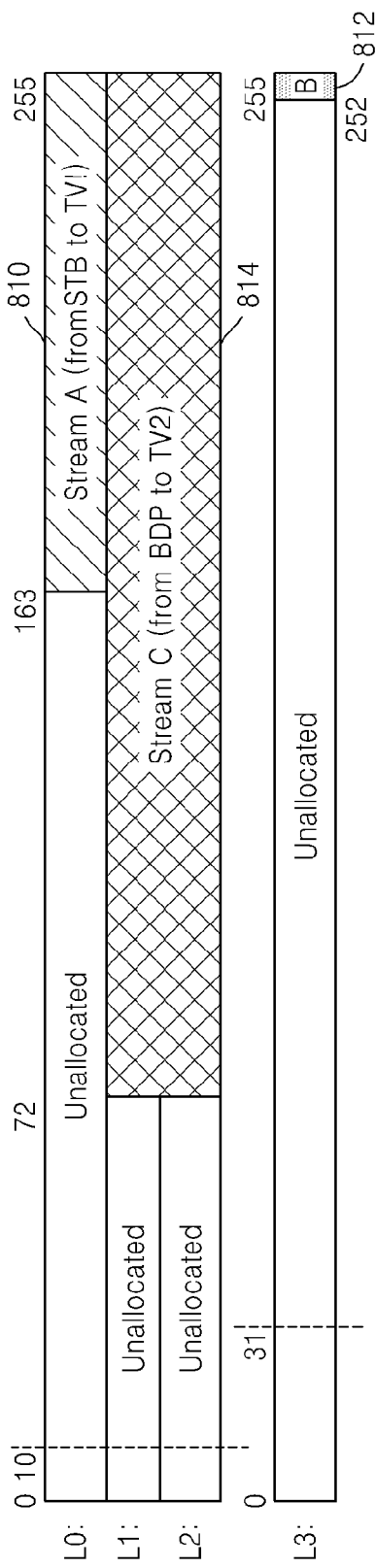
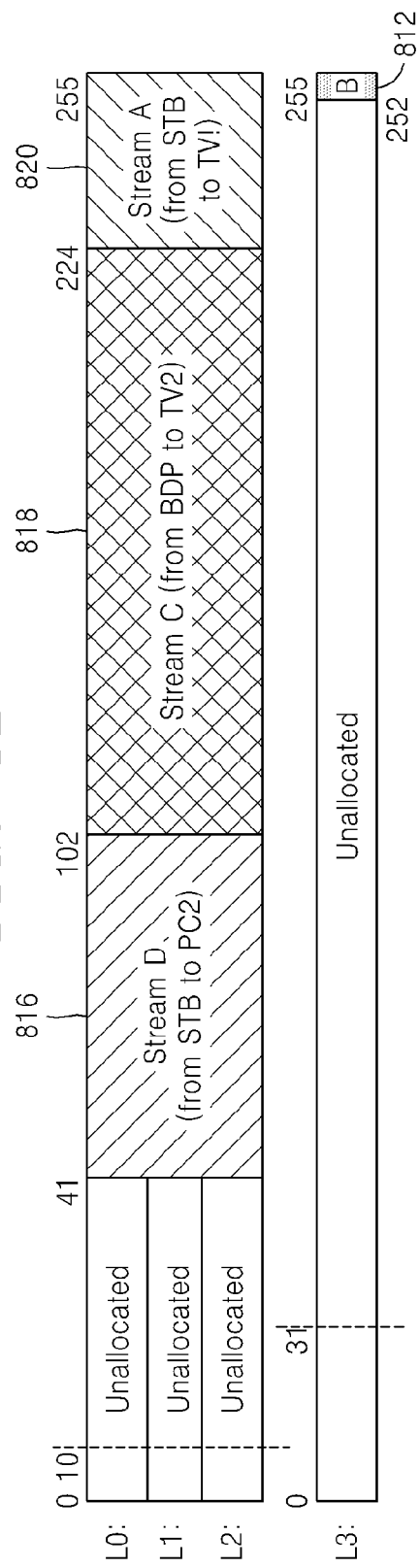
FIG. 8C
FIG. 8D

FIG. 9

| SUB-PORT | TRANSPORT SERVICE TYPE | SOURCE ADDRESS | STREAM INDEX | LANE | LANE# | STARTING POSITION | DURATION | STREAM BANDWIDTH | AVAILABLE BANDWIDTH |
|---|---|---|---|---|---|---|---|---|---|
| RDA_STB | RDA_STB | RDA_STB | 0x01 | 1st Lane | L0 | 255 | 31 | A (1782) | Max_TxSP_BW -SUM(A,C,D, ..., AA) |
| | | | | 2nd Lane | L1 | 225 | 31 | | |
| | | | | 3st Lane | L2 | 225 | 31 | | |
| | | RDA_BDP | 0x01 | 1st Lane | L0 | 103 | 122 | C (7128) | |
| | | | | 2nd Lane | L1 | 103 | 122 | | |
| | | | | 3st Lane | L2 | 103 | 122 | | |
| | | RDA_STB | 0x02 | 1st Lane | L0 | 42 | 61 | D (3564) | |
| | | | | 2nd Lane | L1 | 42 | 61 | | |
| | | | | 3st Lane | L2 | 42 | 61 | | |
| | ⋮ | | | | | | | | |
| | RDA_STB | RDA_ANY | — | 1st Lane | L0 | 0 | 11 | AA (625) | |
| | | | | 2nd Lane | L1 | 0 | 11 | | |
| | | | | 3st Lane | L2 | 0 | 11 | | |
| RxSP | isochronous | RDA_TV1 | 0x01 | 1st Lane | L3 | 253 | 3 | B (49) | Max_RxSP_BW -SUM(E,...,BB) |
| | | | | 2nd Lane | — | — | — | | |
| | | | | 3st Lane | — | — | — | | |
| | | RDA_GC | 0x01 | 1st Lane | L3 | 70 | 183 | E (3564) | |
| | | | | 2nd Lane | — | — | — | | |
| | | | | 3st Lane | — | — | — | | |
| | ⋮ | | | | | | | | |
| | asynchronous | RDA_ANY | — | 1st Lane | L3 | 0 | 32 | BB (625) | |
| | | | | 2nd Lane | — | — | — | | |
| | | | | 3st Lane | — | — | — | | |

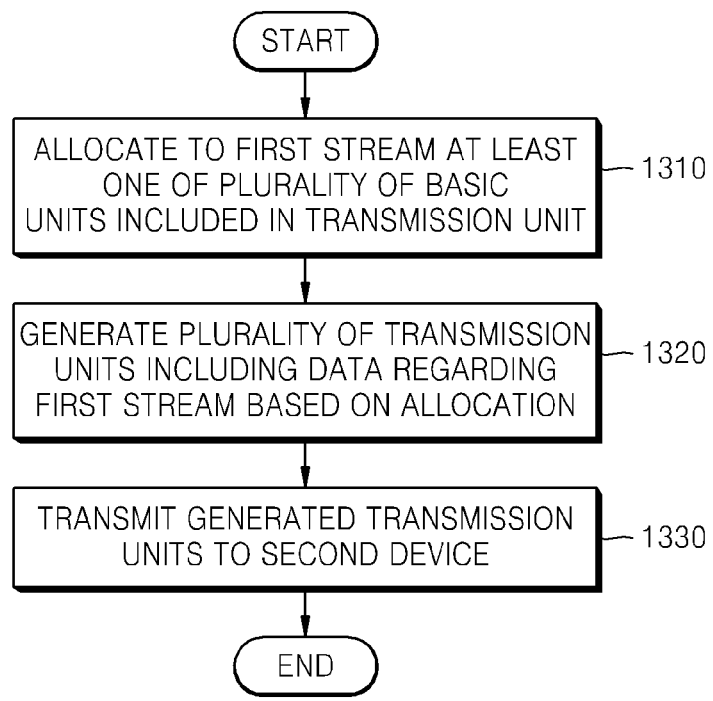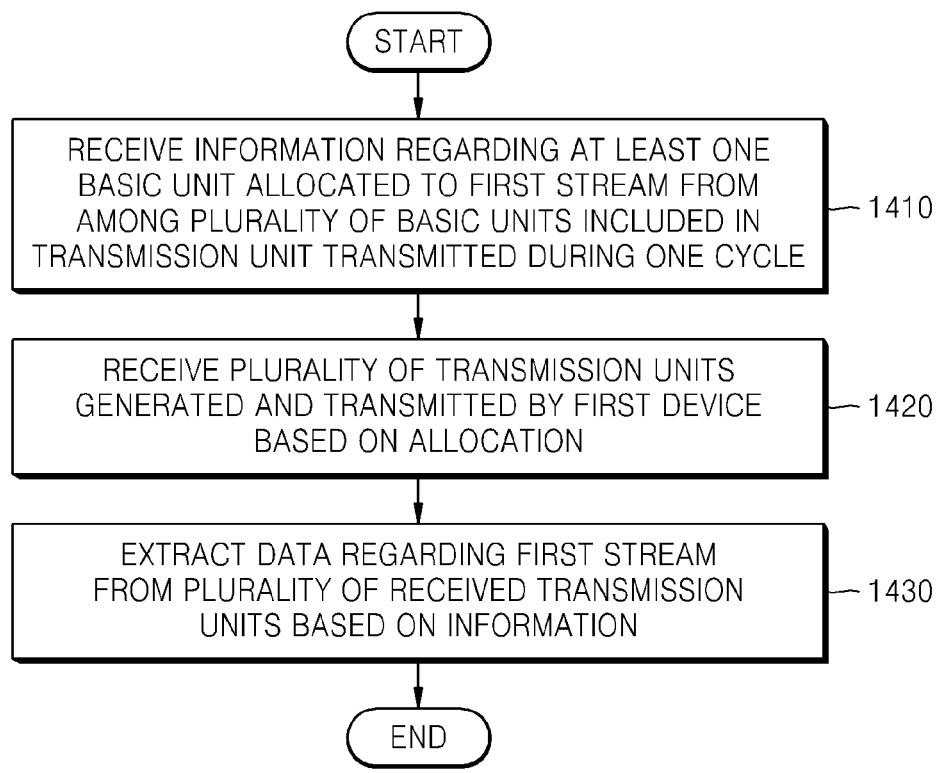

METHOD AND APPARATUS FOR MULTIPLEXING AND DEMULTIPLEXING DATA TRANSMITTED AND RECEIVED BY USING AUDIO/VIDEO INTERFACE

CROSS-REFERENCE TO RELATED PATENT APPLICATION

This application claims the benefit of U.S. Provisional Patent Application No. 61/375,433, filed on Aug. 20, 2010, in the U.S. Patent and Trademark Office, and the benefit of Korean Patent Application No. 10-2011-0072079, filed on Jul. 20, 2011, in the Korean Intellectual Property Office, the disclosures of which are incorporated herein in their entirety by reference.

BACKGROUND

1. Field

Apparatuses and methods consistent with exemplary embodiments relate to transmitting and receiving data based on an audio/video (AV) interface, and more particularly, to multiplexing and demultiplexing data transmitted and received by using an A/V interface.

2. Description of the Related Art

A source device for providing audio/video (AV) data and a sink device for receiving and reproducing the AV data from the source device are connected to each other based on a predetermined AV interface.

For example, the source device and the sink device may be connected based on an AV interface such as a digital visual interface (DVI) or a high-definition multimedia interface (HDMI) for transmitting digital AV data.

SUMMARY

An aspect may be achieved by providing a method and an apparatus for transmitting and receiving data in a network generated based on an audio/video (AV) interface.

Another aspect may be achieved by providing a computer readable recording medium having recorded thereon a computer program for executing the method.

According to another aspect, there is provided a method of transmitting data from a first device to a second device which are connected using an audio/video (AV) interface, the method including allocating to a first stream at least one of a plurality of basic units of a transmission unit; generating an additional plurality of transmission units including data regarding the first stream based on the allocation; and transmitting the additional plurality of generated data transmission units to the second device, wherein the allocation is cyclically changeable, and wherein the additional plurality of transmission units are a plurality of transmission units transmitted during one cycle.

The allocating may further include allocating at least one other basic unit from the plurality of basic units to a second stream, and the generating may further include generating the additional plurality of transmission units including data regarding the first stream and data regarding the second stream.

The AV interface may further include a plurality of lanes for allowing bidirectional data transmission.

The allocating may further include allocating to the first stream the at least one of the plurality of basic units included in the transmission unit transmitted via one of the plurality of lanes used to transmit data from the first device to the second device.

The allocating may further include allocating to the first stream the at least one of a plurality of basic units included in a transmission unit transmitted via at least two of the plurality of lanes used to transmit data from the first device to the second device, and the generating may further include generating an additional plurality of transmission units transmitted via the plurality of lanes used to transmit data from the first device to the second device.

The allocating may further include allocating to the first stream the at least one basic unit from the plurality of basic units of the transmission unit transmitted via a first lane; and allocating to a second stream at least one other basic unit from another plurality of basic units included in another transmission unit transmitted via a second lane, and the generating may further include generating a first additional plurality of transmission units transmitted via the first lane and including data regarding the first stream; and generating a second additional plurality of transmission units transmitted via the second lane and including data regarding the second stream.

From among the plurality of transmission units transmitted during one cycle, at least one transmission unit which is initially transmitted may include information regarding the allocation.

According to another aspect, there is provided a method of receiving data by a second device from a first device which are connected using an audio/video (AV) interface, the method including receiving information regarding at least one basic unit allocated to a first stream from among a plurality of basic units included in a transmission unit transmitted during one cycle; receiving an additional plurality of transmission units that are generated and transmitted by the first device based on the allocation; and extracting data regarding the first stream from the additional plurality of received transmission units based on the received information, wherein the allocation is cyclically changeable, and wherein the additional plurality of transmission units are a plurality of transmission units included in one cycle.

According to yet another aspect, there is provided an apparatus for transmitting data from a first device to a second device, which are connected using an audio/video (AV) interface, the apparatus including a manager which allocates to a first stream at least one of a plurality of basic units included in a transmission unit; and a port unit which generates an additional plurality of transmission units including data regarding the first stream based on the allocation, and which transmits the additional plurality of generated data transmission units to the second device, wherein the allocation is cyclically changeable, and wherein the additional plurality of transmission units are a plurality of transmission units transmitted during one cycle.

According to yet another aspect, there is provided an apparatus for receiving data by a second device from a first device which are connected using an audio/video (AV) interface, the apparatus including a manager which receives information regarding at least one basic unit allocated to a first stream from among a plurality of basic units included in a transmission unit transmitted during one cycle; and a port unit which receives an additional plurality of transmission units generated and transmitted by the first device based on the allocation, and which extracts data regarding the first stream from the additional plurality of received transmission units based on the received information, wherein the allocation is cyclically changeable, and wherein the additional plurality of transmission units are a plurality of transmission units included in one cycle.

According to yet another aspect, there is provided a non-transitory computer readable recording medium having recorded thereon a computer program for executing the method.

BRIEF DESCRIPTION OF THE DRAWINGS

The above aspects and/or other features will become more apparent by describing in detail exemplary embodiments thereof with reference to the attached drawings in which:

FIG. 6 is a diagram showing a method of allocating transmission units, according to an exemplary embodiment;

FIGS. 8A through 8E are diagrams showing a method of allocating transmission units to a plurality of streams, according to an exemplary embodiment;

FIG. 9 is a table showing settings of an AV link, according to an exemplary embodiment;

FIG. 13 is a flowchart illustrating a method of transmitting data using an AV interface, according to an exemplary embodiment; and FIG. 14 is a flowchart illustrating a method of receiving data using an AV interface, according to an exemplary embodiment.

DETAILED DESCRIPTION OF EXEMPLARY EMBODIMENTS

Figure 1:
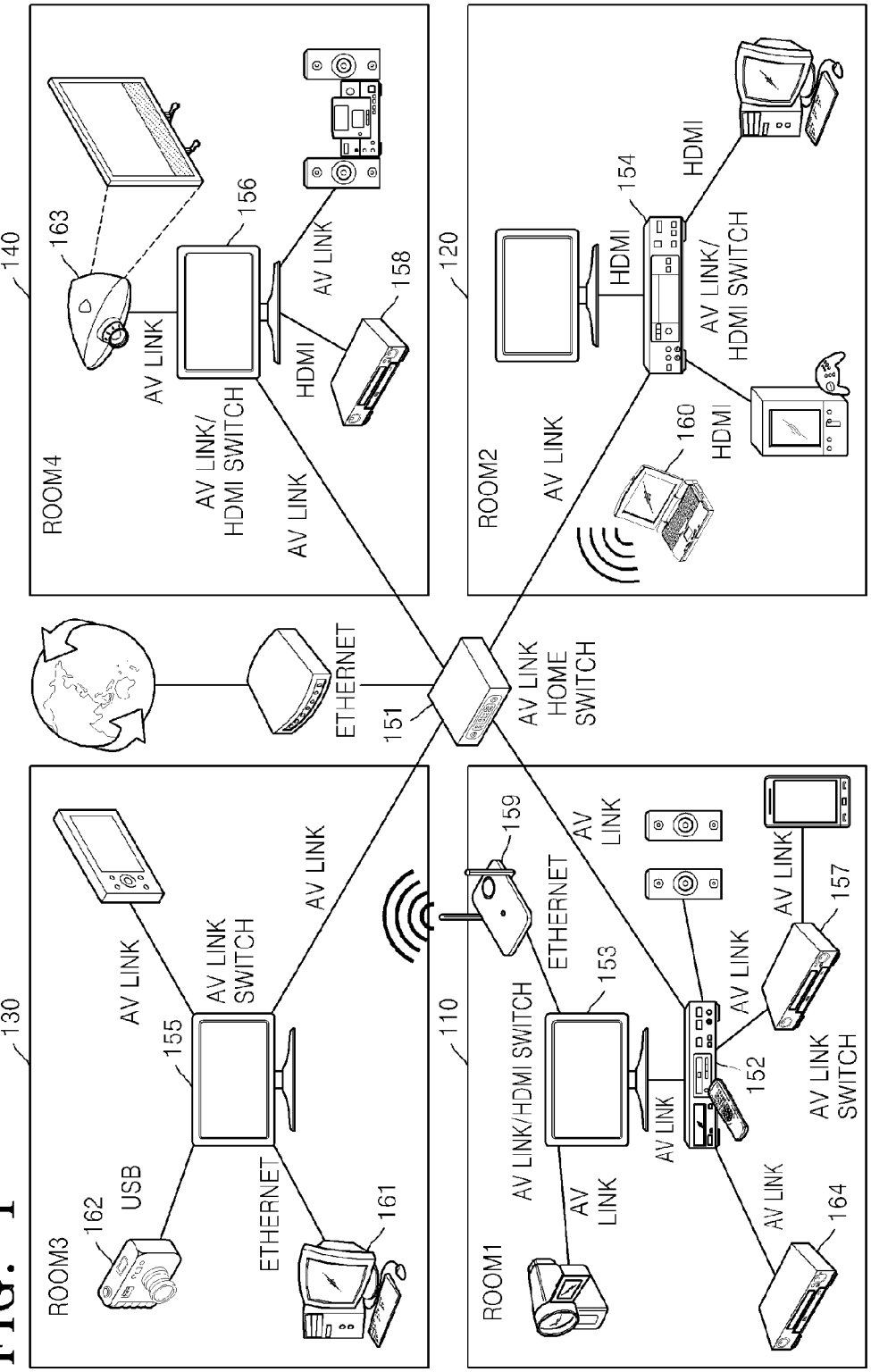
FIG. 1 is a diagram showing a network topology of devices connected based on an audio/video (AV) interface, according to an exemplary embodiment.

Hereinafter, exemplary embodiments will be described with reference to the attached drawings. The exemplary embodiments may be embodied in various forms without being limited to the exemplary embodiments set forth herein. Descriptions of well-known parts are omitted for clarity, and like reference numerals refer to analogous elements throughout. Exemplary embodiments will be described regarding elements that directly relate to an inventive concept, and descriptions of other elements will be omitted. However, it does not mean that the elements whose descriptions are omitted are unnecessary for embodying a method and an apparatus described below.

FIG. 1 is a diagram showing a network topology of devices connected based on an audio and/or video (AV) interface, according to an exemplary embodiment. The AV interface refers to an interface for transmitting and receiving AV data. An 'AV link' refers to a link established based on an AV interface according to an exemplary embodiment, and a high-definition multimedia interface (HDMI) refers to a connection based on a HDMI cable.

Referring to FIG. 1, AV devices may form a network based on an AV interface. AV devices in a plurality of rooms may be connected to various other AV devices in the same or different rooms based on an AV interface. In this case, a switch device for relaying an AV link relays connection based on an AV interface. The switch device may be an additional device for relaying an AV link, e.g., an AV link home switch 151, or may be an AV device (152, 153, 154, 155, 156, or 157) having a switch function. AV devices such as an AV receiver (AVR) 152, a television (TV) 153, and a Bluray disc player (BDP) 157 function as switch devices in a room1 110, and AV devices such as TVs 155 and 156 function as switch devices in a room3 130 and a room4 140.

Also, a switch device may be a device for switching an AV interface according to an exemplary embodiment and an HDMI. For example, a switch device 154 in a room2 120 may receive AV data from a computer and a game console (GC) based on an HDMI, and may transmit the received AV data to a device in the room1 110, the room3 130, or the room4 140 via an AV link according to an exemplary embodiment.

The devices illustrated in FIG. 1 may be classified according to their functions to source/leaf devices, source/switch devices, switch devices, sink/switch devices, and sink/leaf devices.

A device for providing AV data without relaying an AV link, e.g., a set-top box (STB) 164 of the room1 110, corresponds to a source/leaf device, and a device for providing AV data to another device and relaying an AV link, e.g., the BDP 157 of the room1 110, corresponds to a source/switch device. Also, a device for only relaying AV links, e.g., the AV link home switch 151, corresponds to a switch device, and a device for receiving AV data from another device and relaying an AV link, e.g., the TV 156 of the room4 140, corresponds to a sink/switch device. Lastly, a device for receiving AV data from another device without relaying an AV link, e.g., the projector 163 of the room4 140, corresponds to a sink/leaf device.

According to the network topology illustrated in FIG. 1, AV data of the BDP 157 of the room1 110 may be transmitted via the AVR 152 and the AV link home switch 151 to the TV 155 of the room3 130 or the TV 156 of the room4 140. Also, a broadcasting signal received by a STB 158 of the room4 140 may be transmitted via the AV link home switch 151 to the TV 155 of the room3 130, or via the AV link home switch 151 and the AVR 152 to the TV 153 of the room1 110.

In other words, as illustrated in FIG. 1, in order to freely transmit and receive AV data in a network based on an AV interface (hereinafter referred to as an 'AV network'), an AV interface according to an exemplary embodiment has to support bidirectional transmission of data.

AV interfaces according to the related art, e.g., a digital visual interface (DVI) and an HDMI, support only unidirectional data transmission from a source device to a sink device. AV data of a source device may be only transmitted to a sink device, and the sink device may not transmit AV data to the source device based on an AV interface according to the related art, e.g., a DVI or an HDMI. For example, the TV 156 of the room4 140 as a sink device may only receive AV data from the STB 158 connected based on an HDMI, and may not transmit AV data to the STB 158.

However, an AV link based on an AV interface according to an exemplary embodiment supports bidirectional transmission of data and may transmit and receive data to and from a device of another room in the network topology illustrated in FIG. 1. In particular, an AV link according to an exemplary embodiment allows bidirectional transmission of uncompressed video data, and an example of bidirectional transmission of data will be described in detail with reference to FIGS. 2A and 2B.

Figure 2A:
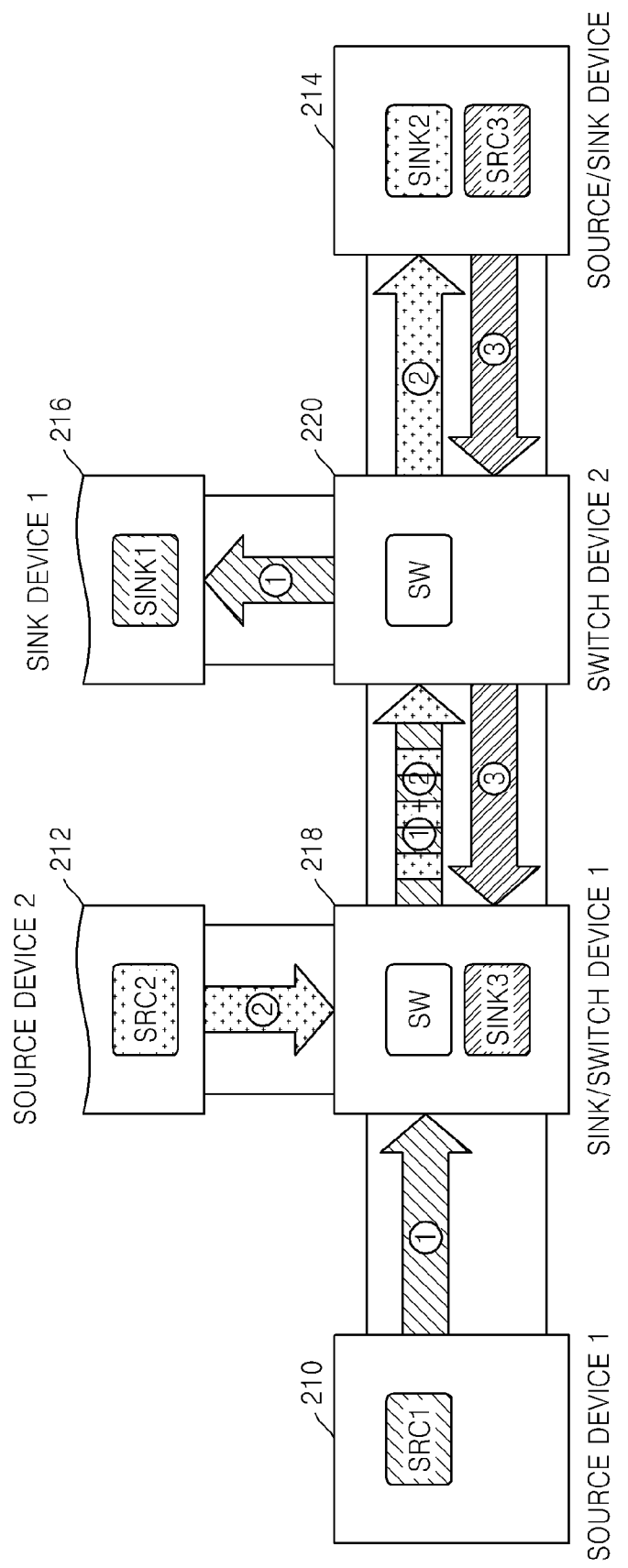
FIG. 2A is a diagram showing bidirectional transmission of data based on an AV interface, according to an exemplary embodiment.

FIG. 2A is a diagram showing bidirectional transmission of data based on an AV interface, according to an exemplary embodiment.

Referring to FIG. 2A, AV data (e.g., uncompressed video data) of a source device1 210 (e.g., a BDP) may be reproduced by a sink device1 216 (e.g., a projector), AV data of a source device2 212 (e.g., a STB) may be reproduced by a source/sink device 214 (e.g., a personal computer (PC)), and AV data of the source/sink device 214 may be reproduced by a sink/switch device1 218 (e.g., a TV).

The sink/switch device1 218 receives the AV data of the source device1 210 and the AV data of the source device2 212 from the source device1 210 and the source device2 212, and transmits the received AV data to a switch device2 220 after performing time division duplexing.

The switch device2 220 receives the AV data of the source device1 210 and the AV data of the source device2 212, relays the received data to transmit the AV data of the source device1 210 to the sink device1 216, and to transmit the AV data of the source device2 212 to the source/sink device 214. Also, the switch device2 220 receives the AV data from the source/sink device 214, and transmits the received AV data to the switch device1 218.

In considerations of links between the sink/switch device1 218 and the switch device2 220 and between the switch device2 220 and the source/sink device 214, AV data, e.g., uncompressed video data, is not transmitted only in one directional but is transmitted in two directions. Accordingly, each exemplary device illustrated in FIG. 2A is connected via one AV interface cable, an AV interface may perform bidirectional data transmission via one cable, and may transmit AV data received from a plurality of source devices, by using a time division duplexing method.

Figure 2B:
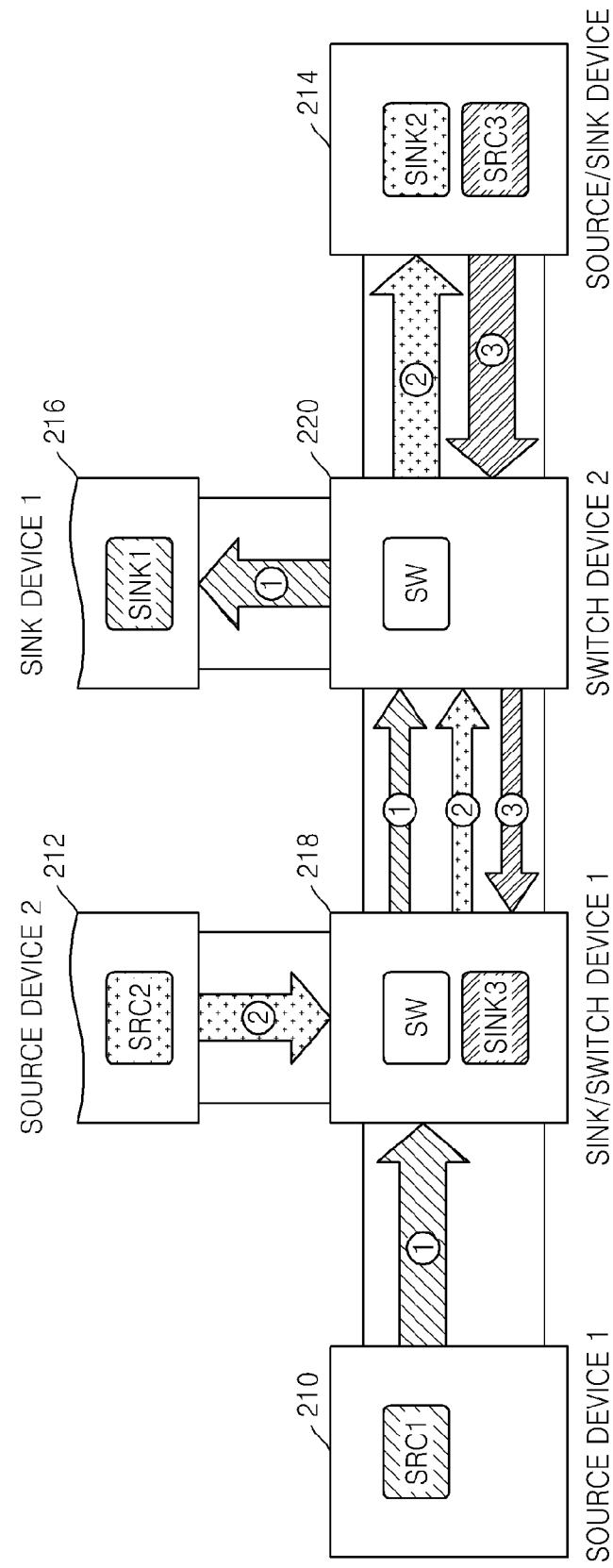
FIG. 2B is a diagram showing bidirectional transmission of data based on an AV interface, according to another exemplary embodiment.

FIG. 2B is a diagram showing bidirectional transmission of data based on an AV interface, according to another exemplary embodiment.

Referring to FIG. 2B, AV data (e.g., uncompressed video data) of the source device1 210 (e.g., a BDP) may be reproduced by the sink device1 216 (e.g., a projector), AV data of the source device2 212 (e.g., a STB) may be reproduced by the source/sink device 214 (e.g., a PC), and AV data of the source/sink device 214 may be reproduced by the sink/switch device1 218 (e.g., a TV).

Although an exemplary method of transmitting and receiving data by using a time division duplexing method is illustrated in FIG. 2A, a method of transmitting and receiving data by using a space division duplexing method is illustrated in FIG. 2B. As will be described later in relation to FIG. 4, an AV link based on an AV interface according to an exemplary embodiment may include a plurality of sub-links. Also, the sub-links may correspond to a plurality of spatially separate lanes representing physical connections between devices. Accordingly, as illustrated in FIG. 2B, AV data may be transmitted and received by using a space division duplexing method based on a plurality of sub-links.

For example, in FIG. 2B, the sink/switch device1 218 may transmit the AV data of the source device1 210 and the AV data of the source device2 212 by using two sub-links after performing space division duplexing. Likewise, when the AV data of the source/sink device 214 is received from the switch device2 220, another sub-link may be used.

An AV interface according to the related art, e.g., a DVI or an HDMI may not allow bidirectional transmission of AV data. Accordingly, a data transmission network may not be formed by using an AV interface as illustrated in FIG. 1. However, an AV interface according to an exemplary embodiment allows bidirectional data transmission via one cable as illustrated in FIGS. 2A and 2B and thus may allow formation of a flexible network in which various device are connected.

Referring back to FIG. 1, various types of data, e.g., Ethernet data and universal serial bus (USB) data, as well as AV data may be transmitted and received based on an AV interface according to an exemplary embodiment. A case when a laptop computer 160 of the room2 120 transmits Ethernet data via a wireless router 159 of the room1 110 to a PC 161 of the room3 130 will be described by way of an example. The Ethernet data refers to data generally transmitted via a transmission control protocol/Internet protocol (TCP/IP)-based local area network (LAN).

However, unlike an AV interface according to the related art, since an AV interface according to an exemplary embodiment supports bidirectional data transmission, Ethernet data may be transmitted and received based on an AV interface. Accordingly, the laptop computer 160 transmits the Ethernet data to the PC 161 in a network formed by using AV links. For this, switch devices in the exemplary network illustrated in FIG. 1 have a function of relaying Ethernet data. By switching link layers, the Ethernet data is transmitted the wireless router 159 to the PC 161.

According to another exemplary embodiment, when USB data of a camera 162 is transmitted to the laptop computer 160, the switch devices transmit the USB data to the laptop computer 160 by using a function of switching the USB data. Since various types of data as well as AV data are transmitted based on an AV interface, various devices may accesses a network connected based on an AV interface and may freely transmit and receive data. The switch devices relay the USB data by switching link layers.

Also, data for controlling a device and a network may also be transmitted and received based on an AV interface according to an exemplary embodiment. For example, a user may control the AVR 152 of the room1 110 by using the TV 153 of the same room. The user controls the AVR 152 by manipulating the TV 153 and transmitting data for controlling the AVR 152 based on an AV interface. Also, the TV 156 or the STB 158 of the room4 140, which accesses a network formed from an AV interface, may also be controlled based on the AV interface.

Since the data for controlling a network connected based on an AV interface may also be transmitted and received using the AV interface, as the data for controlling the network, data for managing the network as well as data for setting links may also be transmitted and received by using the AV interface.

Since various types of data are transmitted and received by using an AV interface, a transmission unit of an AV network may include information regarding a data type. The information regarding the data type may be included in a header of the transmission unit of the AV network.

Furthermore, power may also be transmitted by using an AV interface according to an exemplary embodiment. Predetermined power may be transmitted via an AV link, e.g., USB interface, to a mobile device. As such, power for charging or operating the mobile device is transmitted.

Figure 3:
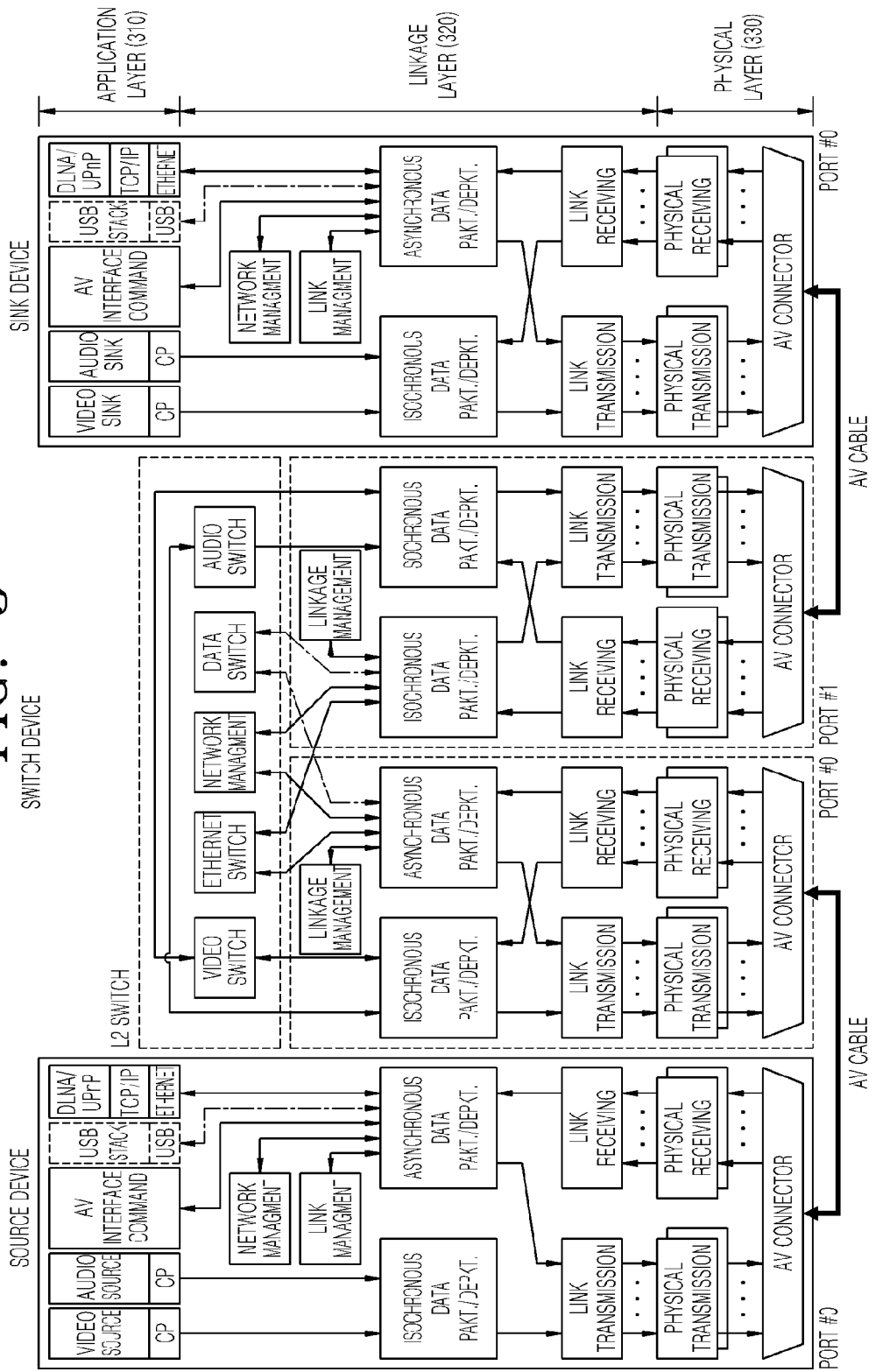
FIG. 3 is a diagram showing a hierarchical structure of a network based on an AV interface, according to an exemplary embodiment.

FIG. 3 is a diagram showing a hierarchical structure of an AV network, according to an exemplary embodiment.

In order to transmit various types of data in two directions based on an AV interface according to an exemplary embodiment as described above in relation to FIG. 1, the hierarchical network structure illustrated in FIG. 3 may be used.

Referring to FIG. 3, the hierarchical network structure includes an application layer 310, a link layer 320, and a physical layer 330.

The application layer 310 includes sub-layers related to processing of data transmitted and received using an AV interface.

The application layer 310 of a source device may include a video source layer for transmitting video data, an audio source layer for transmitting audio data, and a content protection (CP) layer for protecting copyrights of AV contents, may also include an Ethernet layer for transmitting Ethernet data, a TCP/IP layer, and a digital living network alliance (DLNA)/universal plug and play (UPnP) layer, and may further include a USB stack for transmitting USB data, and an AV interface command layer for controlling an AV network.

Likewise, the application layer 310 of a sink device may include a video sink layer for receiving video data, an audio sink layer for receiving audio data, and a CP layer for protecting copyrights of AV contents, may also include an Ethernet layer for receiving Ethernet data, a TCP/IP layer, and a DLNA/UPnP layer, and may further include a USB stack for transmitting USB data, and an AV interface command layer for transmitting control data.

The link layer 320 provides a function of accurately transmitting data of the application layer 310 to a target device. The link layer 320 includes an isochronous data pakt./depkt. layer for packetizing or depacketizing data that requires real-time transmission, e.g., audio data and video data, also includes an asynchronous data pakt./depkt. layer for packetizing or depacketizing data that does not require real-time transmission, e.g., Ethernet data, USB data, and network control data, and further includes a link management layer for managing AV links, and a network management layer for managing a network based on the AV links.

A switch device includes a video switch layer, an audio switch layer, an Ethernet switch layer, and a data switch layer for switching the link layer 320. The video switch layer and the audio switch layer determine a source address and a destination address of the link layer 320 based on the depacketization result of the isochronous data pakt./depkt. layer, and perform switching based on the determination result. Likewise, the Ethernet switch layer and the data switch layer determine a source address and a destination address of the link layer 320 based on the depacketization result of the asynchronous data pakt./depkt. layer, and perform switching based on the determination result.

The physical layer 330 is a layer for converting data of the link layer 320 into a physical signal to transmit the data via a cable. All of the source device, the switch device, and the sink device include the physical layer 330, and the physical layer 330 includes an AV connector, a physical transmission layer for transmitting data, and a physical reception layer for receiving data.

The isochronous data pakt./depkt. layer or the asynchronous data pakt./depkt. layer of the link layer 320 may transmit packetized data to a link transmission layer, and the link transmission layer may multiplex and transmit the packetized data to the physical layer 330. As described above in relation to FIG. 2B, an AV link according to an exemplary embodiment may include a plurality of sub-links to perform space division duplexing, and an AV cable may include a plurality of spatially separate lanes corresponding to the sub-links. Accordingly, the link transmission layer may multiplex the packetized data, may allocate the multiplexed data to the lanes, and then may transmit the allocated data to a plurality of physical transmission layers corresponding to the lanes.

On the other hand, data received by a plurality of physical reception layers corresponding to the lanes may be transmitted to the link reception layer, and link reception layer may demultiplex and transmit the data received from the physical reception layers, to the isochronous data pakt./depkt. layer or the asynchronous data pakt./depkt. layer. The isochronous data pakt./depkt. layer or the asynchronous data pakt./depkt. layer depaketizes and transmits the received data to the application layer 310 or switch layers.

Exemplary transmission and reception of data according to the hierarchical network structure illustrated in FIG. 3 are performed based on an address allocated to each device in an AV network. In order to identify devices connected based on an AV interface, a predetermined address is allocated to each device and data is transmitted and received based on the allocated address.

Figure 4:
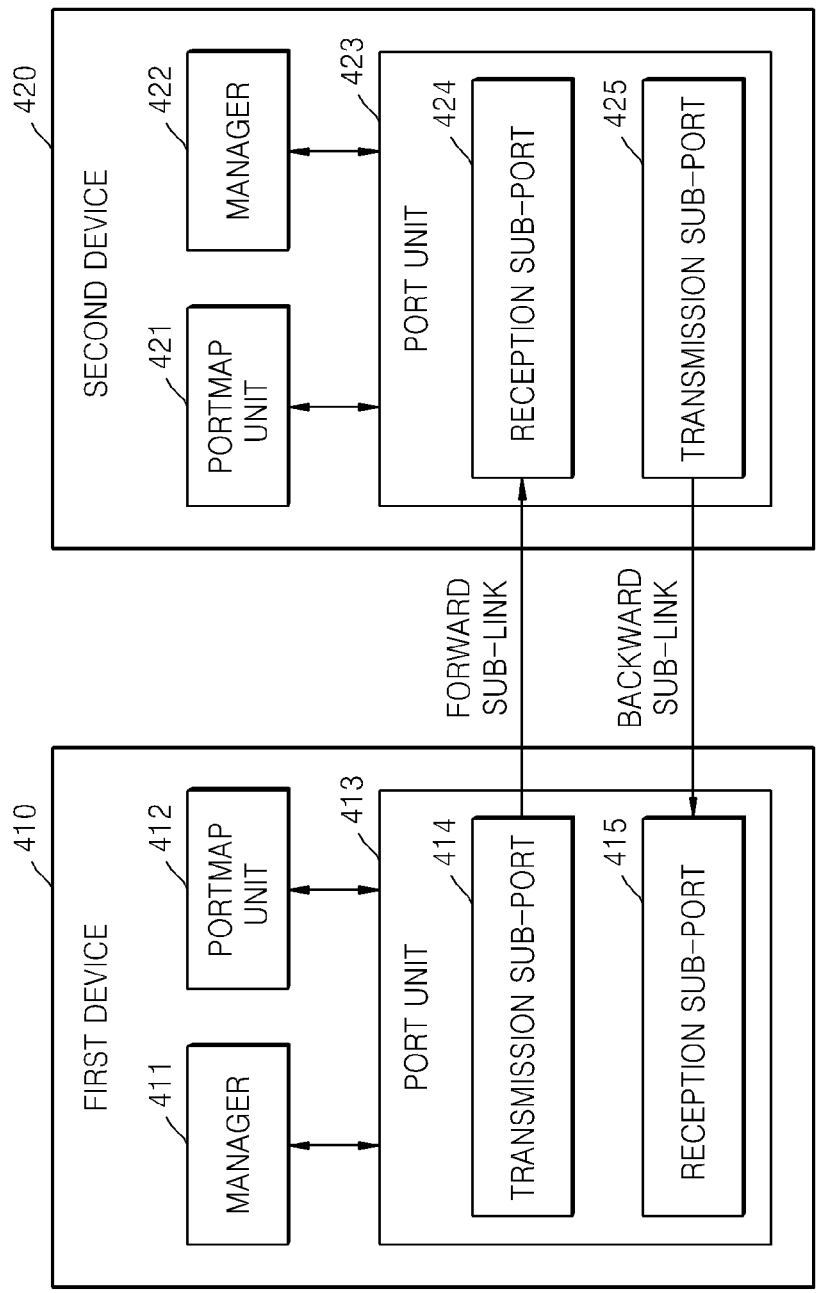
FIG. 4 is a diagram showing an apparatus for transmitting data and an apparatus for receiving data based on an AV interface, according to an exemplary embodiment.

FIG. 4 is a diagram showing an apparatus for transmitting data and an apparatus for receiving data by using an AV interface, according to an exemplary embodiment.

Referring to FIG. 4, a first device 410 and a second device 420 transmit and receive data based on AV links, for example as described above in relation to FIGS. 1 through 3. Since an AV link established using an AV interface according to an exemplary embodiment allows bidirectional data transmission, the first and second devices 410 and 420 may transmit data in two directions by using forward and backward sub-links.

A data transmission and reception apparatus of the first device 410 includes a manager 411, a portmap unit 412, and a port unit 413. A data transmission and reception apparatus of the second device 420 includes a portmap unit 421, a manager 422, and a port unit 423. Modules (411 through 413) included in the first device 410 and modules (421 through 423) included in the second device 420 symmetrically perform predetermined functions for transmitting or receiving data.

The managers 411 and 422 set an AV link, and the port units 413 and 423 transmit or receive data according to an exemplary setting of the AV link.

As described above in relation to FIG. 2B, an AV link according to an exemplary embodiment may include a plurality of physically separate lanes. In order to set the AV link, the managers 411 and 422 set a transmission direction of each lane, and set a multiplexing method of data transmitted via each lane. The manager 411 coordinates with the manager 422 and sets the AV link. The AV link is set by comparing amounts of data transmitted from the first device 410 to the second device 420 and data transmitted from the second device 420 to the first device 410. The AV link may be set when the first and second devices 410 and 420 are connected to establish the AV link. The setting of the AV link may be periodically changed. An exemplary method of setting a transmission direction of an AV lane will now be described in greater detail by way of an example with reference to FIGS. 5A through 5F.

FIGS. 5A through 5F are diagrams showing a method of setting an AV link, according to an exemplary embodiment. Referring to FIGS. 5A through 5F, an AV link according to an exemplary embodiment may include a plurality of lanes, e.g., L0, L1, L2, and L3. Each lane represents a physical connection between devices and may correspond to a twisted pair (TP). Bidirectional data communication is allowed via each lane.

Figure 5A:
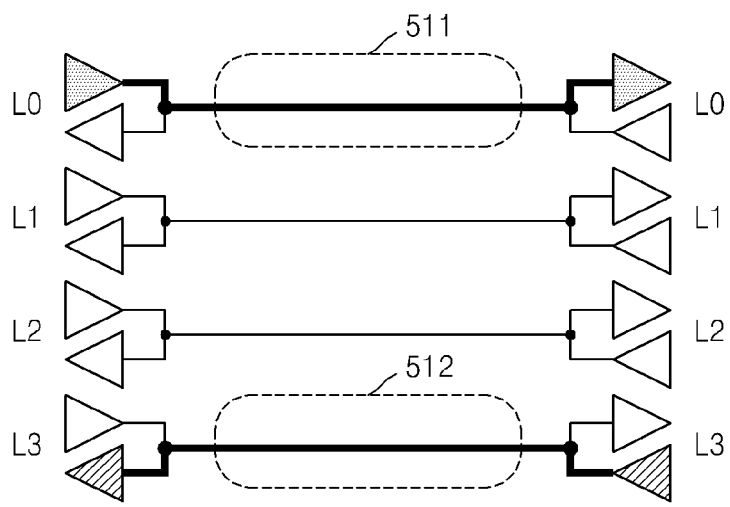
FIGS. 5A through 5F are diagrams showing a method of setting an AV link, according to an exemplary embodiment.

If an AV link is being set, as illustrated by way of an example in FIG. 5A, the manager 411 of the first device 410 (shown in FIG. 4) sets a data transmission direction of L0 as a forward direction (a direction from the first device 410 to the second device 420) to form a forward sub-link 511, and sets a data transmission direction of L3 as a backward direction (a direction from the second device 420 to the first device 410) to form a backward sub-link 512. The AV link may be completely set by exchanging control data for setting the AV link with the manager 422 of the second device 420 (shown in FIG. 4) via the forward and backward sub-links 511 and 512.

Figure 5B:
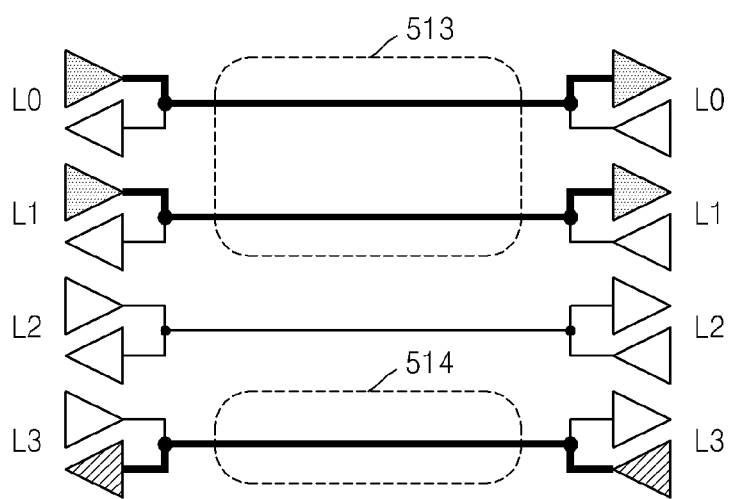

After the control data is transmitted and received via the forward and backward sub-links 511 and 512, if another lane needs to be set as a forward direction, as illustrated by way of an example in FIG. 5B, a transmission direction of L1 may be set to be a forward direction. As such, L0 and L1 are included in a forward sub-link 513 and L3 is included in a backward sub-link 514.

Figure 5C:
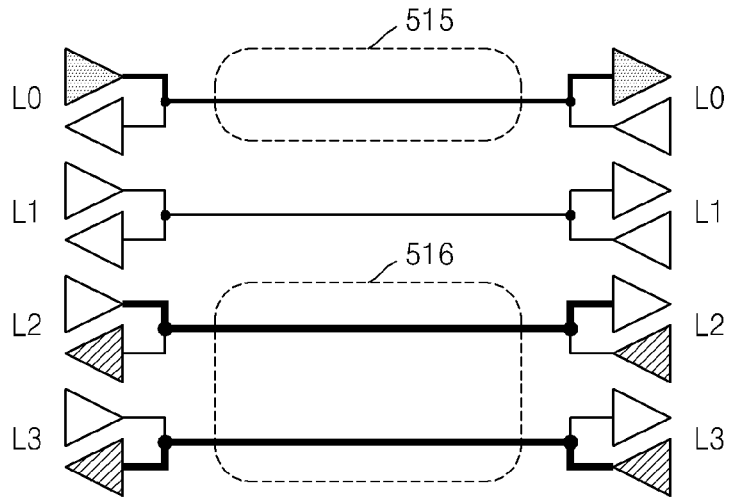
Figure 5D:
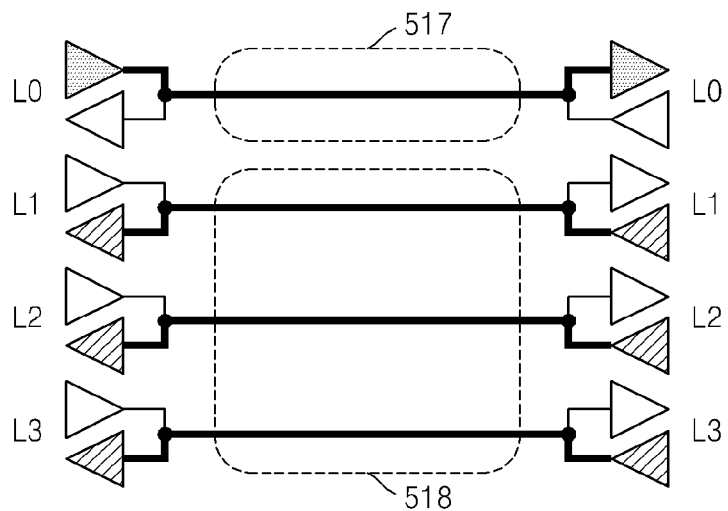
Figure 5E:
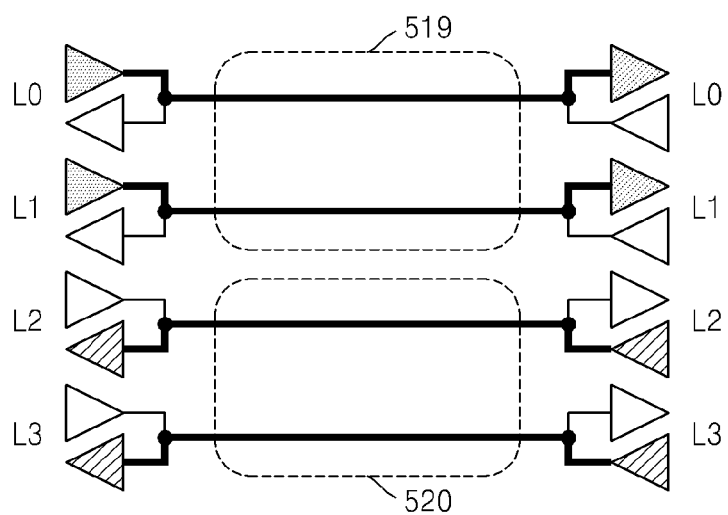

Otherwise, after the control data is transmitted and received via the forward and backward sub-links 511 and 512, if another lane needs to be set as a backward direction, as illustrated by way of an example in FIG. 5C, a transmission direction of L2 may be set to be a backward direction. As such, L2 and L3 are included in a backward sub-link 516 and only L0 is included in a forward sub-link 515.

All lanes may be included in forward or backward sub-links. As illustrated by way of an example in FIG. 5D, a transmission direction of L0 may be set as a forward direction, and transmission directions of L1, L2, and L3 may be set as backward directions, thereby forming forward and backward sub-links 517 and 518, respectively. Also, as illustrated by way of an example in FIG. 5E, transmission directions of L0 and L1 may be set as forward directions, and transmission directions of L2 and L3 may be set as backward directions, thereby forming forward and backward sub-links 519 and 520, respectively. Lastly, as illustrated by way of an example in FIG. 5F, transmission directions of L0, L1, and L2 may be set as forward directions, and only a transmission direction of L3 may be set as a backward direction, thereby forming forward and backward sub-links 521 and 522.

Although one AV link includes four lanes in exemplary embodiment illustrated in FIGS. 5A through 5F, the number of lanes included in an AV link is not restricted and four is provided by way of illustration only. It would be easily understood by one of ordinary skill in the art that, if a plurality of lanes for allowing bidirectional data transmission are included in an AV link, the direction of each lane may be set according to the exemplary method illustrated with reference to FIGS. 5A through 5F.

Referring back to FIG. 4, if transmission directions of a plurality of lanes are determined as illustrated by way of an example in FIGS. 5A through 5F, the managers 411 and 422 set a multiplexing method of data transmitted via each lane.

As described above in relation to FIGS. 2A and 2B, a switch device (218 or 220) may relay data from and to a plurality of devices. Since data is relayed based on a space division duplexing method or a time division duplexing method, the space division duplexing method or the time division duplexing method may be performed by allocating transmission units as illustrated by way of an example in FIG. 6.

FIG. 6 is a diagram showing a method of allocating transmission units, according to an exemplary embodiment. In FIG. 6, allocation of transmission units to a forward sub-link when the first device 410 transmits data to the second device 420 will be described by way of an example. It would be easily understood by one of ordinary skill in the art that the same method may be used to allocate transmission units to a backward sub-link used when the second device 420 transmits data to the first device 410.

Referring to FIG. 6, data is transmitted via an AV link according to an exemplary embodiment by allocating transmission units to data transmitted from the first device 410 to the second device 420 (shown in FIG. 4), generating transmission units including the data based on the allocation result, and transmitting generated transmission units. Each of the transmission units includes a plurality of basic units and refers to a unit for performing multiplexing.

One cycle 610, 620, or 630 may include a plurality of transmission units (e.g., 1024 transmission units), and the transmission units may be simultaneously transmitted via a plurality of lanes. Also, each transmission unit may include a plurality of basic units (e.g., 256 basic units), and a basic unit refers to a minimum data unit. For example, a basic unit of image data having a bit depth of 8 bits may be 8 bits. However, since an 8-bit basic unit may be channel-coded to be transmitted and received between devices, the channel-coded basic unit may be bits greater than 8 bits (e.g., 10 bits).

The cycle 610, 620, or 630 refers to a cycle in which allocation of transmission units is changed. The manager 411 of the first device 410 may change allocation of transmission units on a predetermined cycle. Since a forward sub-link for transmitting data from the first device 410 to the second device 420 may include a plurality of lanes, the manager 411 of the first device 410 (shown in FIG. 4) may set a different allocation of transmission units with respect to each lane, or may set the same allocation of transmission units with respect to all lanes.

Transmission units are allocated by allocating a plurality of basic units included in one transmission unit 640 to predetermined data. For example, when the first device 410 multiplexes and transmits data regarding a stream A and a stream B to the second device 420, transmission units may be allocated by allocating basic units included in one transmission unit 640 to the streams A and B.

If transmission units transmitted via a first lane are allocated to the stream A, and transmission units included in a second lane are allocated to the stream B, since data regarding different streams are transmitted via different lanes, it means that the streams A and B are multiplexed based on the above-mentioned space division duplexing method. Also, in order to transmit the streams A and B via all lanes, if some of a plurality of basic units included in a transmission unit are allocated to the stream A, and others of the basic units are allocated to the stream B, it means that the streams A and B are multiplexed based on the above-mentioned time division duplexing method. Exemplary detailed descriptions thereof are provided below with reference to FIGS. 7, and FIGS. 8A through 8E.

Allocation of transmission units may be changed in each cycle 610, 620, or 630, and information regarding the allocation of transmission units is included in a cycle start packet 621 or 631 when each cycle 610, 620, or 630 is started, and is transmitted to the second device 420. The manager 422 of the second device 420 may receive the information regarding the allocation of transmission units in the cycle start packet 621 or 631 of the cycle 610, 620, or 630, and may demultiplex the received data based on the received information. The cycle start packet 621 or 631 may be included in at least one transmission unit initially transmitted on each cycle 610, 620, or 630 as illustrated in FIG. 6.

Figure 7:
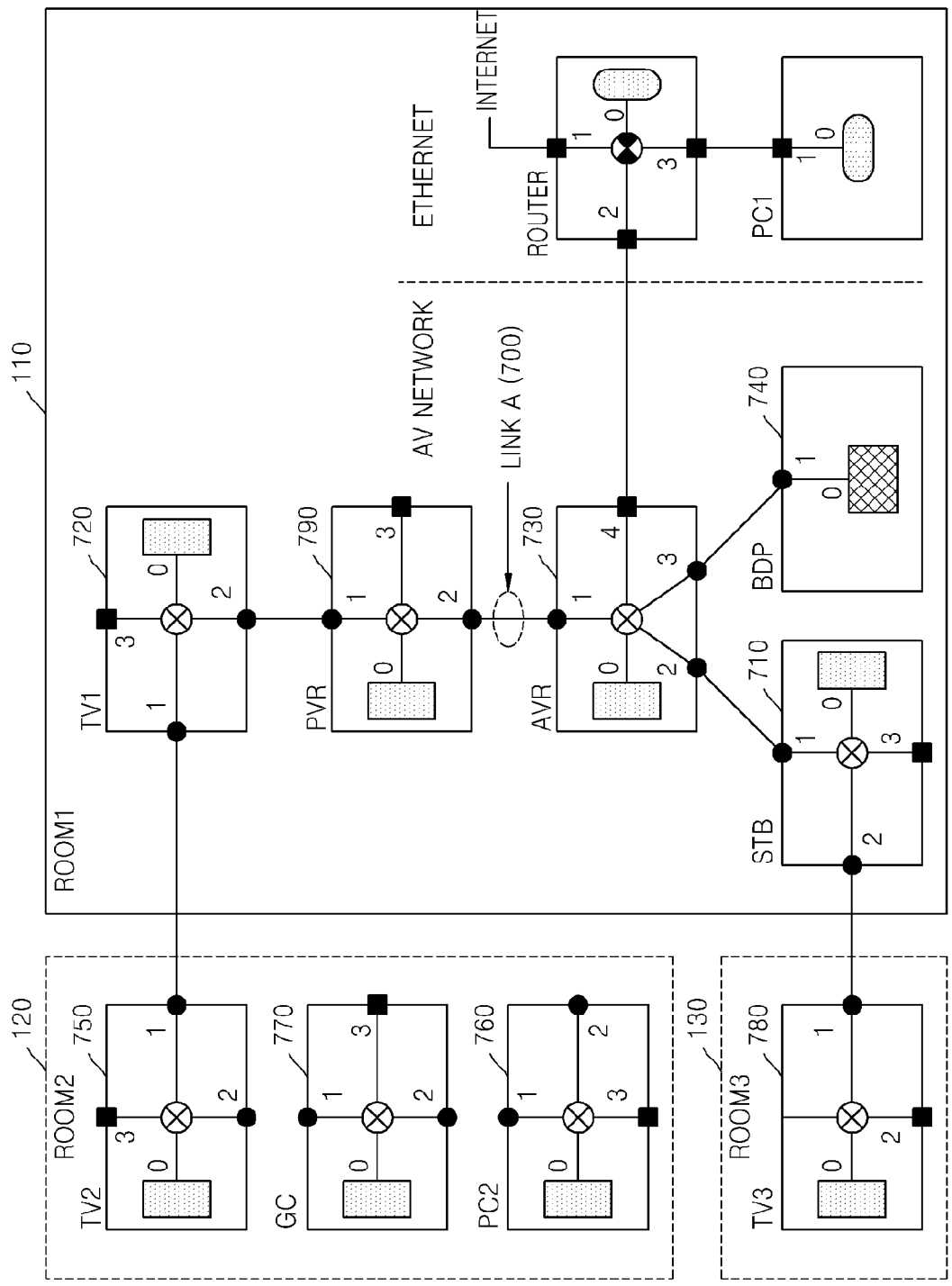
FIG. 7 is a diagram showing devices in a network established based on an AV interface, according to an exemplary embodiment.

FIG. 7 is a diagram showing devices in a network formed by using an AV interface, according to an exemplary embodiment. In FIG. 7, marked numbers refer to numbers of ports, and black circles refer to ports of an AV network. All number-0 ports refer to ports having a host function, and black rectangles refers to Ethernet ports. Circles with X refer to switches for relaying transmitted and received data in an AV network. However, a router switch refers to an Ethernet switch for relaying only Ethernet data.

FIG. 7 shows in detail that an AVR 730 and a personal video recorder (PVR) 790 allocate transmission units to a link A 700 when the AVR 730 corresponds to the first device 410 and the PVR 790 corresponds to the second device 420.

In FIG. 7, a case when an STB 710 transmits a stream A to a TV1 720, the TV1 720 transmits a stream B to the AVR 730, the BDP 740 transmits a stream C to a TV2 750, the STB 710 transmits a stream D to a PC2 760, and a GC 770 transmits a stream E to a TV3 780 will be described by way of an example. The streams A, C, and D are transmitted in a forward direction of the link A 700 (a direction from the AVR 730 to the PVR 790), and the streams B and E are transmitted in a backward direction of the link A 700 (a direction from the PVR 790 to the AVR 730).

The manager 411 of the AVR 730 and the manager 422 of the PVR 790 determine a data rate required to reproduce each stream in a sink device while maintaining an appropriate level of quality of service (QoS). If the data rate of each stream is determined, transmission units are allocated according to the determined data rate.

The manager 411 of the AVR 730 and the manager 422 of the PVR 790 determine the number of basic units allocated to ensure the determined data rate of each stream. For example, if the stream A requires a data rate of 1.782 Gbps to be reproduced by the TV1 720 while maintaining the QoS, the number of basic units allocated to ensure the data rate of 1.782 Gbps may be determined. Exemplary detailed descriptions thereof are provided below with reference to FIGS. 8A through 8E.

Figure 5F:
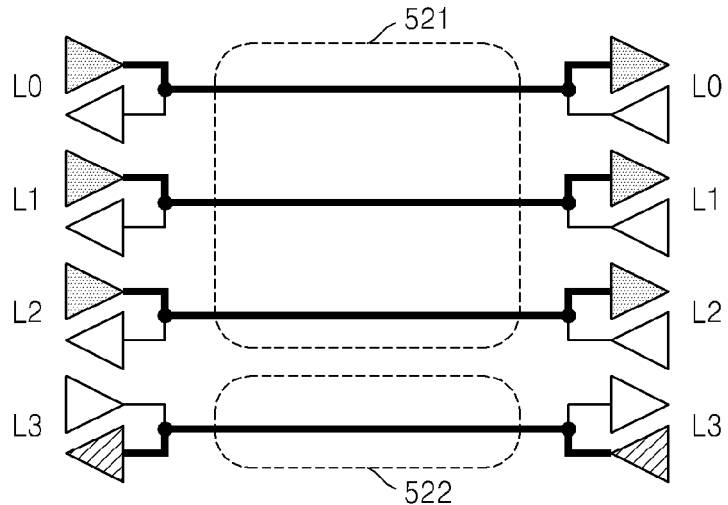
Figure 8E:
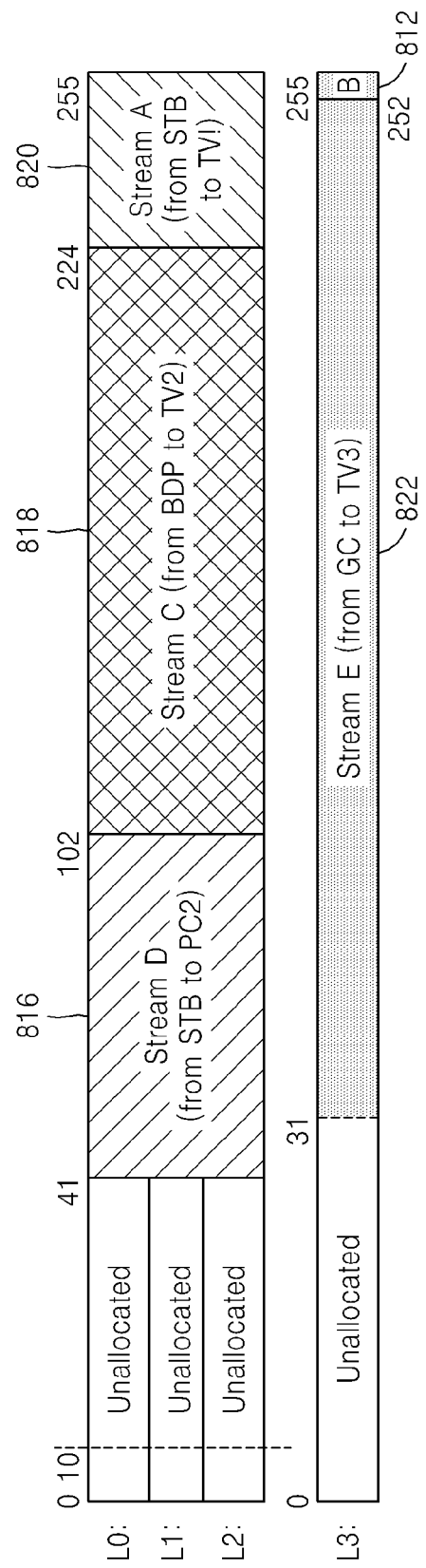

FIGS. 8A through 8E are diagrams showing a method of allocating transmission units to a plurality of streams, according to an exemplary embodiment. FIGS. 8A and 8B show a method of multiplexing a plurality of streams by allocating transmission units when L0 is included in a forward sub-link and L3 is included in a backward sub-link as illustrated in FIG. 8A. FIGS. 8C through 8E show a method of multiplexing a plurality of streams by allocating transmission units when L0, L1, and L2 are included in a forward sub-link and only L3 is included in a backward sub-link as illustrated in FIG. 5F.

FIG. 8A shows allocation of transmission units when only the stream A is transmitted via the link A 700 in a forward direction. Referring to FIG. 8A, only some basic units of a transmission unit of L0 included in a forward sub-link may be allocated to the stream A. The manager 411 of the AVR 730 determines the number of basic units allocated to the stream A from among a plurality of basic units included in the transmission unit based on a data rate of the stream A, and allocates to the stream A 92 basic units from 163rd to 255th basic units from among a total of 256 basic units included in one transmission unit. As described above in relation to FIG. 6, the allocation of transmission units is maintained for one cycle. Accordingly, all transmission units transmitted via L0 for one cycle follow the allocation method illustrated in FIG. 8A.

As described above in relation to FIG. 3, asynchronous data that does not require real-time transmission as well as isochronous data that requires real-time transmission, e.g., an AV stream, are transmitted and received via an AV link according to an exemplary embodiment. Accordingly, if all basic units of a transmission unit are allocated to the AV stream, no basic unit may be allocated to the asynchronous data and thus the asynchronous data may not be transmitted. Accordingly, when transmission units are allocated, lower bounds of isochronous basic units are set to ensure basic units allocated to the asynchronous data. In FIG. 8A, at least 32 basic units are ensured in each of forward and backward sub-links.

FIG. 8B shows a case when the stream A is transmitted in a forward direction and the stream B is transmitted in a backward direction via the link A 700 (shown in FIG. 7) according to an exemplary embodiment. As illustrated in FIG. 8A, some basic units 810 of a transmission unit transmitted via L0 included in a forward sub-link are allocated to the stream A. Also, the manager 422 of the PVR 790 determines the number of basic units allocated to the stream B from among a plurality of basic units included in a transmission unit based on a data rate of the stream B, and allocates to the stream B a plurality of basic units 812 of a transmission unit transmitted via L3 included in a backward sub-link as illustrated in FIG. 8B. When the stream A is transmitted from the AVR 730 to the PVR 790 as illustrated by way of an example in FIG. 8A, if the stream B is added, transmission units may be allocated as illustrated by way of an example in FIG. 8B.

FIG. 8C shows a case when the streams A and C are transmitted in a forward direction and the stream B is transmitted in a backward direction via the link A 700 (shown in FIG. 7) according to an exemplary embodiment. Basic units included in transmission units allocated to the streams A and B are analogous to the ones illustrated in FIG. 8B. However, since the stream C is also transmitted in a forward direction, the manager 411 of the AVR 730 (shown in FIG. 7) determines the number of basic units allocated to the stream C from among a plurality of basic units included in a transmission unit based on a data rate of the stream C, and allocates to the stream C a plurality of basic units 814 of transmission units transmitted via L1 and L2 included in a forward sub-link. Since the number of basic units allocated to the stream C is greater than the maximum number of basic units allocated to one lane, the plurality of basic units 814 of transmission units transmitted a plurality of lanes (e.g., L1 and L2) are allocated to the stream C.

In FIG. 8C, lower bounds of exemplary isochronous basic units of transmission units transmitted via lanes included in a forward sub-link are different from those illustrated in FIGS. 8A and 8B because, since asynchronous data is transmitted in a forward direction via three lanes in FIG. 8C while asynchronous data is transmitted in a forward direction via one lane in FIGS. 8A and 8B, the size of asynchronous data transmitted via one lane is one third (⅓).

When the stream A is transmitted from the AVR 730 to the PVR 790 and the stream B is transmitted from the PVR 790 to the AVR 730 as illustrated by way of an example in FIG. 8B, if the stream C is added, transmission units may be allocated by way of an example as illustrated in FIG. 8C.

FIG. 8D shows a case when the streams A, C, and D are transmitted in a forward direction and the stream B is transmitted in a backward direction via the link A 700 (shown in FIG. 7). Basic units included in a transmission unit allocated to the stream B are similar to those illustrated by way of an example in FIG. 8C.

Since, in addition to the streams A and C, the stream D is also transmitted in a forward direction, the manager 411 of the AVR 730 determines the number of basic units allocated to the stream D from among a plurality of basic units included in a transmission unit based on a data rate of the stream D, and allocates to the stream D a plurality of basic units 816 of transmission units transmitted via L0, L1, and L2 included in a forward sub-link. However, if the basic units 816 are allocated to the stream D, the basic units allocated to the streams A and C may not be maintained as illustrated in FIG. 8C because the basic units 816 may not be allocated to the stream D as illustrated in FIG. 8D while the basic units are allocated to the streams A and C as illustrated in FIG. 8C.

Accordingly, as illustrated in FIG. 8D, a plurality of basic units 820 of transmission units transmitted via L0, L1, and L2 are allocated to the stream A, and another plurality of basic units 818 are allocated to the stream C.

When the streams A and C are transmitted from the AVR 730 to the PVR 790 and the stream B is transmitted from the PVR 790 to the AVR 730 as illustrated in FIG. 8C, if the stream D is added, transmission units may be allocated as illustrated in FIG. 8D.

FIG. 8E shows a case when the streams A, C, and D are transmitted in a forward direction and the streams B and E are transmitted in a backward direction via the link A 700 (shown in FIG. 7) according to an exemplary embodiment. Basic units included in transmission units allocated to the streams A, B, C, and D are similar to those illustrated by way of an example in FIG. 8D.

Since, in addition to the stream B, the stream E is also transmitted in a backward direction, the manager 422 of the PVR 790 determines the number of basic units allocated to the stream E from among a plurality of basic units included in a transmission unit based on a data rate of the stream E, and allocates to the stream E a plurality of basic units 822 of a transmission unit transmitted via L3 included in a backward sub-link.

When the streams A, C, and D are transmitted from the AVR 730 to the PVR 790 and the stream B is transmitted from the PVR 790 to the AVR 730 as illustrated by way of an example in FIG. 8D, if the stream E is added, transmission units may be allocated by way of an example as illustrated in FIG. 8E.

Referring back to FIG. 4, if the AV link is completely set by the managers 411 and 422, the port units 413 and 423 transmit and receive data according to settings of the AV link. The settings of the AV link set by the managers 411 and 422 are respectively stored in the portmap units 412 and 421, and the port units 413 and 423 transmit and receive data based on the settings of the AV link stored in the portmap units 412 and 421. A transmission sub-port 414 of the first device 410 transmits data to a reception sub-port 424 of the second device 420, and a transmission sub-port 425 of the second device 420 transmits data to a reception sub-port 415 of the first device 410.

FIG. 9 is a table showing settings of an AV link, according to an exemplary embodiment.

In FIG. 9, settings of an AV link stored in the portmap unit 412 of the first device 410 will be described by way of an example. FIG. 9 shows settings of an AV link when transmission units are allocated as illustrated in FIG. 8E. It would be easily understood by one of ordinary skill in the art that settings symmetrical to the settings shown in FIG. 9 may be stored in the portmap unit 421 of the second device 420.

Referring to FIG. 9, sub-port, transport service type, source address, stream index, lane, lane#, starting position, duration, stream bandwidth, and available bandwidth items may be included in the settings of the AV link.

The sub-port item defines a transmission sub-port for transmitting data and a reception sub-port for receiving data, and the transport service type item defines isochronous data and asynchronous data. The source address item defines an address of a source device of transmitted or received data. The address of the source device may be an address of an AV network, and "RDA_ANY" indicates that a source device of asynchronous data is not specified. The stream index item defines an identifier of a stream of isochronous data, the lane item sequentially defines lanes included in a forward or backward sub-link, and the lane# item defines an identifier of a lane.

The starting position item defines a starting position of basic units allocated to each stream by the managers 411 and 422, and the duration item defines the number of basic units allocated to each stream. The stream bandwidth item defines a bandwidth required to transmit each stream, and the available bandwidth defines a bandwidth other than the bandwidth allocated to each stream.

Referring back to FIG. 4, the transmission sub-port 414 of the port unit 413 and the transmission sub-port 425 of the port unit 423 generate and transmit transmission units to the opposite devices according to the exemplary settings of the AV link stored in the portmap units 412 and 421. Accordingly, information regarding the settings of the AV link stored in the portmap units 412 and 421 is exchanged between the first and second devices 410 and 420 before beginning to transmit data. The exchanged information regarding the settings of the AV link includes information regarding allocation of transmission units as described above by way of an example with reference to FIG. 9. Also, since the allocation of transmission units may be changed in a predetermined cycle as described above by way of an example with reference to FIG. 6, the first and second devices 410 and 420 may exchange the information regarding the allocation of transmission units in a predetermined cycle. The information regarding the allocation of transmission units may be included in a cycle start packet and may be exchanged by the first and second devices 410 and 420 when each cycle starts. The first device 410 transmits to the second device 420 information regarding allocation of transmission units transmitted via a forward sub-link, and the second device 420 transmits to the first device 410 information regarding allocation of transmission units transmitted via a backward sub-link. The information regarding the allocation of transmission units is data for controlling a network, and is asynchronous data. Exemplary detailed descriptions thereof will now be provided with reference to FIGS. 10 and 11.

Figure 10:
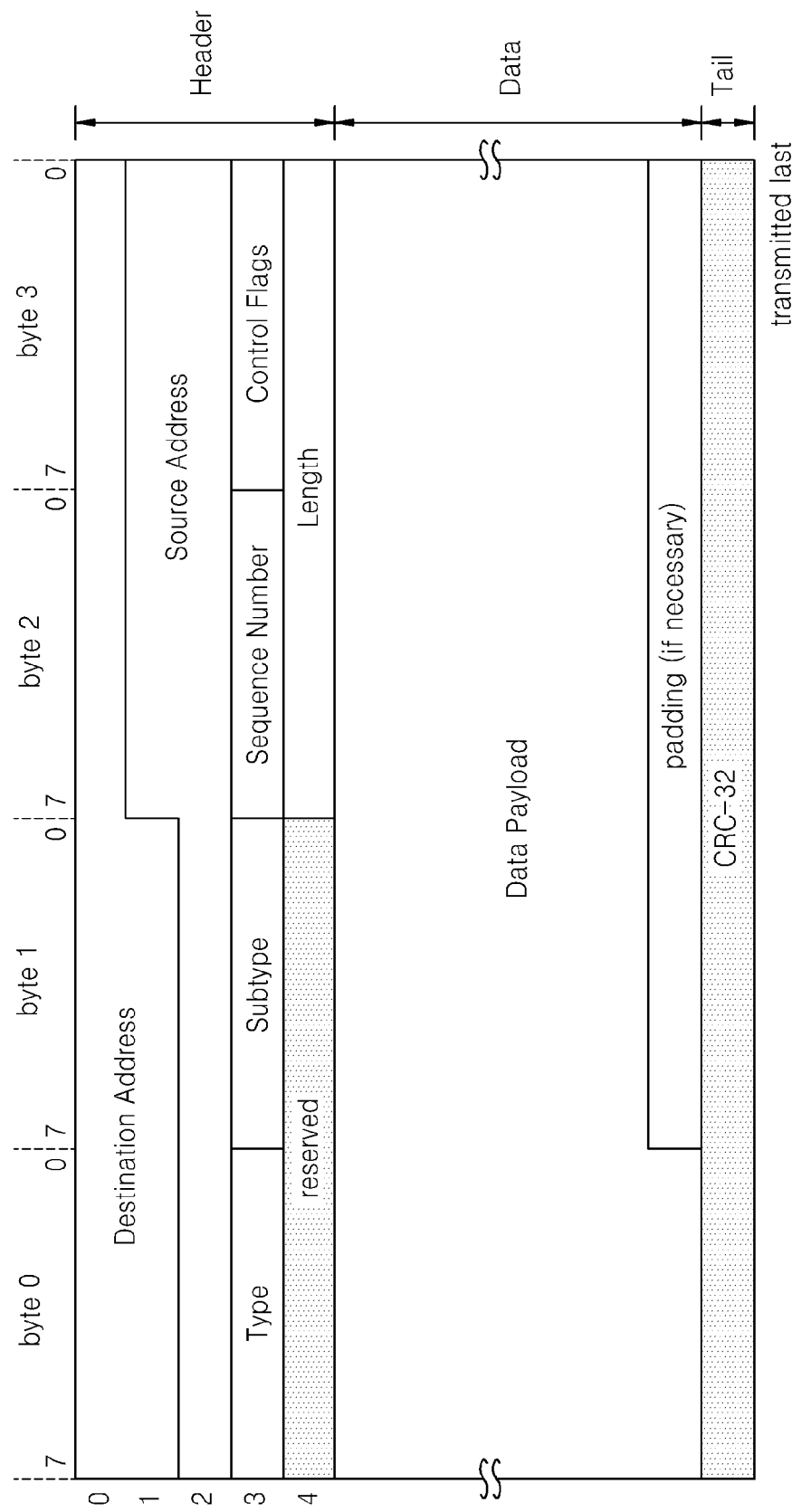
FIG. 10 is a diagram showing an asynchronous data packet according to an exemplary embodiment.

FIG. 10 is a diagram showing an asynchronous data packet according to an exemplary embodiment.

Referring to FIG. 10, a "Header" of the asynchronous data packet transmitted and received in an AV network includes a "Destination Address" field indicating an AV network address of a destination, and a "Source Address" field indicating an AV network address of a source. A "Type" field which defines the type of the asynchronous data packet. A "data" field of a transmission unit in an AV network includes substantially transmitted data. The data field carries data as data payload and also may include some padding if necessary. If the asynchronous data packet includes information regarding allocation of transmission units, the information regarding the allocation of transmission units is included in the "data" field.

Figure 11:
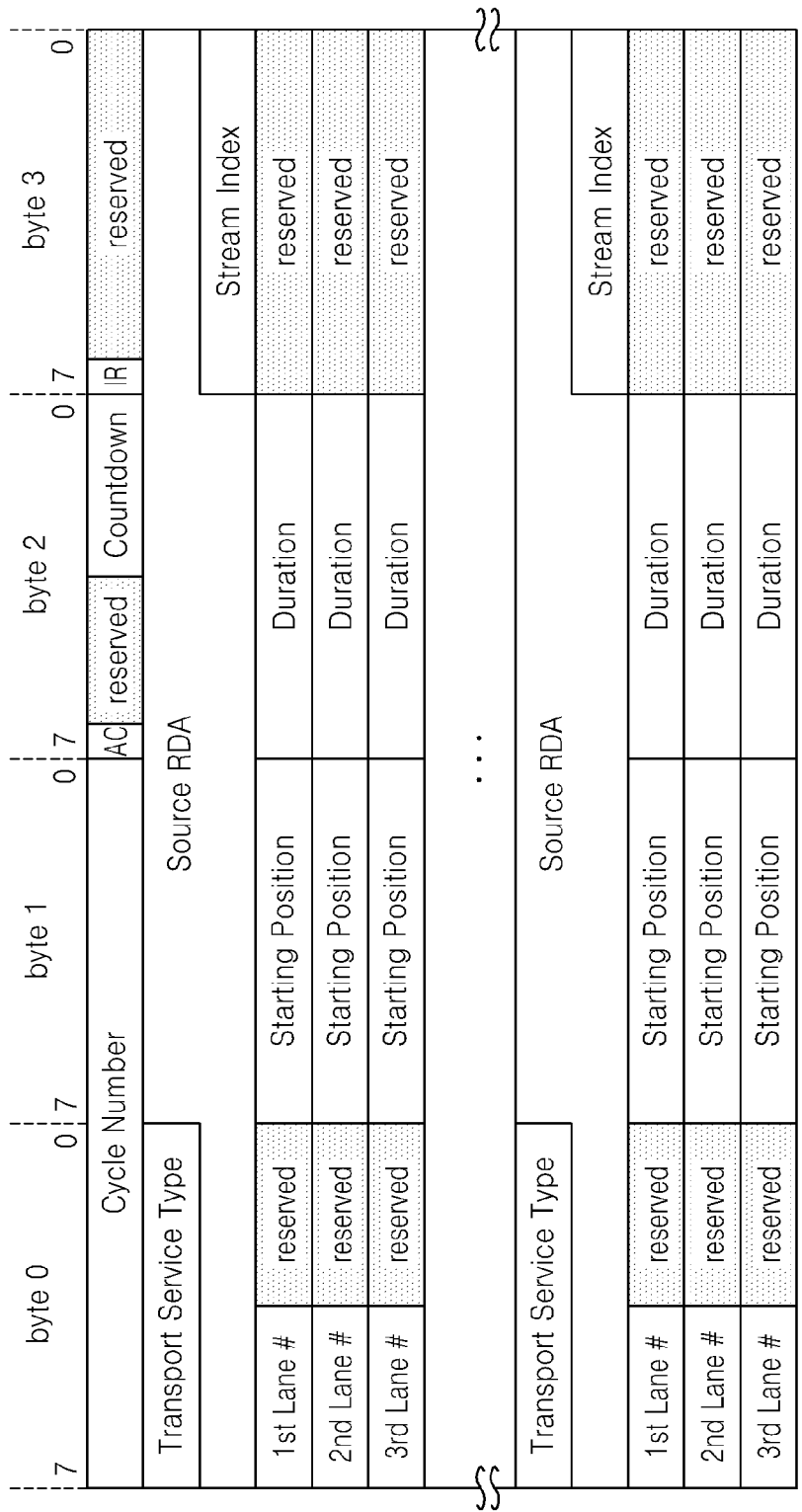
FIG. 11 is a diagram showing information regarding allocation of transmission units, according to an exemplary embodiment.

FIG. 11 is a diagram showing information regarding allocation of transmission units, according to an exemplary embodiment.

Referring to FIG. 11, since the information regarding the allocation of transmission units may be changed in a cycle, a "Cycle Number" item defines a number for specifying a cycle. A "Transport Service Type" item is similar to the transport service type item described above with reference to FIG.

9, a "Source RDA" item is similar to the source address item described above with reference to FIG. 9. Also, "Starting Position" and "Duration" items are similar to the starting position and duration items, respectively, described above with reference to FIG. 9. A "Stream Index" item is similar to the stream index item described above with reference to FIG. 9.

An "Initialization Request (IR)" item is an item for requesting to initialize an opposite direction sub-link. For example, if an error continuously occurs in data received by the first device 410 from the second device 420 via a backward sub-link, the first device 410 may set the "IR" item as "1" to request initialization of the backward sub-link when transmitting information regarding allocation of transmission units via a forward sub-link to the second device 420.

"Allocation Change (AC)" and "Countdown" items are items for notifying the opposite device i.e., the device at the other end (receiving or transmitting device) about a change in allocation of transmission units. Exemplary detailed descriptions thereof are provided below with reference to FIG. 12.

Referring back to FIG. 4, the manager 411 of the first device 410 generates information regarding allocation of transmission units transmitted via a lane included in a forward sub-link, according to the exemplary format illustrated in FIG. 11, and transmits the information to the manager 422 of the second device 420, and the manager 422 of the second device 420 generates information regarding allocation of transmission units transmitted via a lane included in a backward sub-link, according to the exemplary format illustrated in FIG. 11, and transmits the information to the manager 411 of the first device 410.

The information regarding the allocation of transmission units, which is illustrated in FIG. 11, is included in the exemplary cycle start packet illustrated in FIG. 6 and is transmitted to the opposite device, and the port units 413 and 423 transmit and receive data with reference to the transmitted information.

The port unit 413 generates a plurality of transmission units based on the information regarding the allocation of transmission units, which is transmitted from the manager 411, and transmits the transmission units to the reception sub-port 424 of the port unit 423. The reception sub-port 424 extracts data regarding a predetermined stream from the received transmission units based on the information regarding the allocation of transmission units transmitted via a forward sub-link, which is received from the manager 422. The reception sub-port 424 specifies at least one basic unit allocated to the predetermined stream and extracts the specified basic unit from the transmission units based on the received information regarding the allocation of transmission units.

Figure 12:
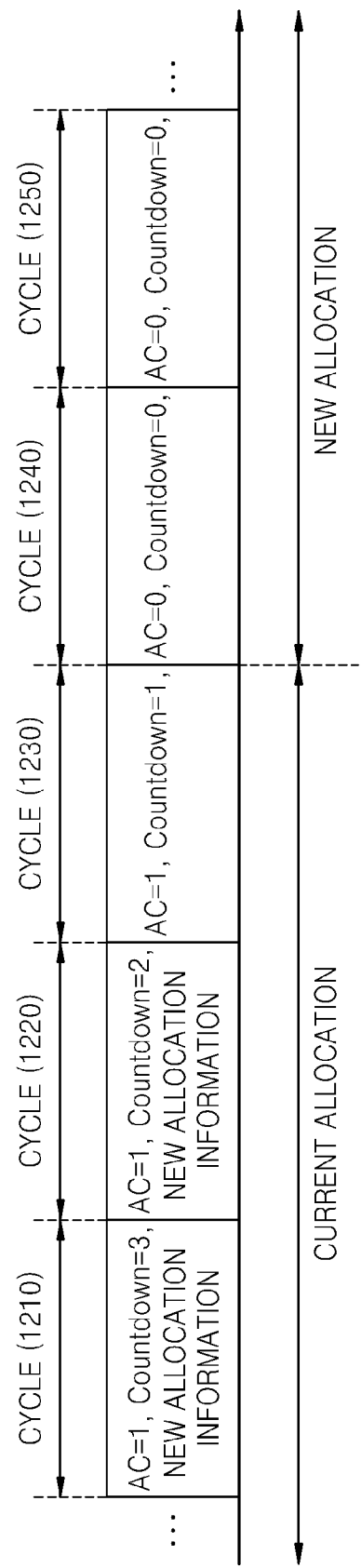
FIG. 12 is a diagram showing a method of changing allocation of transmission units, according to an exemplary embodiment.

FIG. 12 is a diagram showing a method of changing allocation of transmission units, according to an exemplary embodiment.

Referring to FIG. 12, when allocation of transmission units is changed, a notification of the change in allocation is provided in advance to the opposite device to allow the opposite device to be prepared. For example, when the first device 410 is to change allocation of transmission units transmitted via transmission sub-links from a cycle 1240, the "AC" item included in cycle start packets of the previous cycles 1210, 1220, and 1230 is set to "1" before transmitting the cycle start packets, so as to notify the second device 420 in advance about the change in allocation of transmission units. The "Countdown" item is also set as illustrated by way of an example in FIG. 12 before transmitting the cycle start packets of the new cycle, so as to notify about the change in allocation of transmission units that will take place from the cycle 1240. The "AC" item of cycles 1240 and 1250 after the allocation of transmission units is changed is set to "0" so as to notify that the allocation of transmission units is not changed and the "Countdown" is also set to "0".

FIG. 13 is a flowchart illustrating a method of transmitting data by using an AV interface, according to an exemplary embodiment.

Referring to FIG. 13, in operation 1310, a data transmission apparatus of a first device allocates to a first stream at least one of a plurality of basic units included in a transmission unit transmitted via an AV link. As described above in relation to FIG. 6, a basic unit of a transmission unit transmitted via at least one lane is allocated to the first stream. A plurality of streams may be transmitted via one AV link. In this case, a plurality of basic units included in a transmission unit may be allocated to the streams. An exemplary method of allocating to one stream a plurality of basic units of a transmission unit transmitted via one lane is described above in relation to FIG. 8A, and an exemplary method of allocating to a plurality of streams a plurality of basic units of transmission units transmitted via a plurality of lanes is described above in relation to FIGS. 8C through 8E. Allocation of transmission units may be changed in a cycle as illustrated in FIG. 6.

In operation 1320, the data transmission apparatus generates a plurality of transmission units including data regarding the first stream based on the allocation in operation 1310. If a plurality of basic units included in a transmission unit are allocated to a plurality of streams in operation 1310, a plurality of transmission units including data regarding the streams are generated.

In operation 1330, the data transmission apparatus transmits the transmission units generated in operation 1320 to a second device. If one stream is transmitted via an AV link, a plurality of transmission units including data regarding the first stream are transmitted to the second device. If a plurality of streams are transmitted, a plurality of transmission units including data regarding the streams are transmitted to the second device.

Before the transmission units are transmitted to the second device, information regarding the allocation of transmission units in operation 1310 may be transmitted to the second device. For example, a cycle start packet including the information regarding the allocation of transmission units may be included in at least one transmission unit initially transmitted in a cycle and may be transmitted to the second device.

FIG. 14 is a flowchart illustrating a method of receiving data based on an AV interface, according to an exemplary embodiment.

Referring to FIG. 14, in operation 1410, a data reception apparatus of a second device receives information regarding allocation of transmission units. For example, information representing a stream to which a plurality of basic units included in a transmission unit transmitted are allocated during one cycle may be received. The information regarding the allocation of transmission units may be included in at least one basic unit initially transmitted in a cycle, as a cycle start packet.

In operation 1420, the data reception apparatus receives a plurality of transmission units that are generated and transmitted by a first device, according to the information received in operation 1410. For example, the first device allocates transmission units and generates and transmits a plurality of transmission units based on the allocation as illustrated in FIGS. 6, and 8A through 8E.

In operation 1430, the data reception apparatus extracts data regarding a first stream from the transmission units received in operation 1420. For example, the data regarding the first stream is extracted based on the information regarding the allocation of transmission units, which is received in operation 1410. If a plurality of basic units of a transmission unit are allocated to a plurality of streams as illustrated in FIGS. 8C through 8E, data regarding the streams may be extracted.

According to an exemplary embodiment, since data transmitted and received by using an AV interface may be multiplexed/demultiplexed, devices in a network established by using an AV interface may freely transmit data to a destination device.

While exemplary embodiments have been particularly shown and described, it will be understood by one of ordinary skill in the art that various changes in form and details may be made therein without departing from the spirit and scope of the invention as defined by the following claims and their equivalents. The invention can also be embodied as computer readable codes on a computer readable recording medium (tangible or non-tangible). The computer readable recording medium is any data storage device that can store data which can be thereafter read by a computer system.

For example, a data transmission apparatus and a data reception apparatus according to an exemplary embodiment may include 1) a bus coupled to every element in the exemplary apparatuses illustrated in FIG. 4, 2) at least one processor connected to the bus, and 3) a memory connected to the bus to store commands, that receives and generates messages, where the processor executes the commands.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

What is claimed is:

1. A method of transmitting data from a first device to a second device which are connected using an audio/video (AV) interface, the method comprising:
    allocating to a first stream at least one of a plurality of basic units of a first transmission unit;
    generating a plurality of additional transmission units each comprising a respective plurality of additional basic units, wherein at least one of the plurality of additional basic units of each of the plurality of additional transmission units is allocated, in an allocation, to the first stream based on the allocating of the plurality of basic units of the first transmission unit; and
    transmitting the generated plurality of additional transmission units to the second device,
    wherein the allocating is cyclically changeable, and
    wherein the generated plurality of additional transmission units are a plurality of transmission units transmitted during one cycle.

2. The method of claim 1, wherein the allocating further comprises allocating at least one other basic unit from the plurality of basic units of the first transmission unit to a second stream, and
    wherein the at least one of the plurality of additional basic units of each of the plurality of additional transmission units is allocated to the first stream and at least one other of the plurality of additional basic units of each of the plurality of additional transmission units is allocated to the second stream based on the allocating of the plurality of basic units of the first transmission unit.

3. The method of claim 1, wherein the AV interface comprises a plurality of lanes for allowing bidirectional data transmission.

4. The method of claim 3, wherein the allocating further comprises allocating to the first stream the at least one of the plurality of basic units of the first transmission unit transmitted via one of the plurality of lanes used to transmit data from the first device to the second device.

5. The method of claim 3, wherein the allocating further comprises allocating to the first stream said at least one of the plurality of basic units of the first transmission unit transmitted via at least two of the plurality of lanes used to transmit data from the first device to the second device, and
    wherein the generating further comprises generating the plurality of additional transmission units transmitted via the plurality of lanes used to transmit data from the first device to the second device.

6. The method of claim 3, wherein the allocating further comprises:
    allocating to the first stream said at least one basic unit from the plurality of basic units of the first transmission unit transmitted via a first lane; and
    allocating to a second stream at least one other basic unit from another plurality of basic units of a second transmission unit transmitted via a second lane, and
    wherein the generating further comprises:
        generating a first plurality of additional transmission units transmitted via the first lane, each of the first plurality of additional transmission units comprising a respective first plurality of additional basic units, wherein at least one of the first plurality of additional basic units of each of the first plurality of additional transmission units is allocated to the first stream based on the allocating of the plurality of basic units of the first transmission unit; and
        generating a second plurality of additional transmission units transmitted via the second lane, each of the second plurality of additional transmission units comprising a respective second plurality of additional basic units, wherein at least one of the second plurality of additional basic units of each of the second plurality of additional transmission units is allocated to the second stream based on the allocating of the plurality of basic units of the second transmission unit.

7. The method of claim 1, wherein, from among the plurality of additional transmission units transmitted during one cycle, at least one transmission unit which is initially transmitted comprises information regarding the allocation of the plurality of additional transmission units.

8. A method of receiving data by a second device from a first device which are connected using an audio/video (AV) interface, the method comprising:
    receiving information regarding at least one basic unit allocated, in an allocation, to a first stream from among a plurality of basic units of a first transmission unit transmitted during one cycle;
    receiving a plurality of additional transmission units generated and transmitted by the first device, each comprising a respective plurality additional basic units, wherein at least one of the plurality of additional basic units of each of the plurality of additional transmission units is allocated to the first stream based on the allocation of the plurality of basic units of the first transmission unit; and
    extracting data regarding the first stream from the plurality of additional transmission units based on the received information, wherein the allocation is cyclically changeable, and
wherein the plurality of additional transmission units are a plurality of transmission units received during one cycle.

9. The method of claim 8, wherein the received information further comprises information regarding at least one other basic unit allocated to a second stream from the plurality of basic units of the first transmission unit, and
wherein the extracting further comprises extracting data regarding the first stream and data regarding the second stream based on the received information.

10. The method of claim 8, wherein the AV interface comprises a plurality of lanes for allowing bidirectional data transmission.

11. An apparatus for transmitting data from a first device to a second device which are connected based on an audio/video (AV) interface, the apparatus comprising:
a manager configured to allocate to a first stream at least one of a plurality of basic units of a first transmission unit in an allocation; and
a port unit configured to generate a plurality of additional transmission units, each comprising a respective plurality of additional basic units, wherein at least one of the plurality of additional basic units of each of the plurality of additional transmission units is allocated to the first stream based on the allocation of the plurality of basic units of the first transmission unit, and configured to transmit the plurality of generated additional data transmission units to the second device,
wherein the allocation is cyclically changeable, and
wherein the plurality of generated additional transmission units are a plurality of transmission units transmitted during one cycle.

12. The apparatus of claim 11, wherein the manager is further configured to allocate at least one other basic unit from the plurality of basic units of the first transmission unit to a second stream, and
wherein at least one of the plurality of additional basic units of each of the plurality of additional transmission units is allocated to the first stream and at least one other of the plurality of additional basic units of each of the plurality of additional transmission units is allocated to the second stream based on the allocation of the plurality of basic units of the first transmission unit.

13. The apparatus of claim 11, wherein the AV interface comprises a plurality of lanes for allowing bidirectional data transmission.

14. The apparatus of claim 13, wherein the manager is further configured to allocate to the first stream at least one of the plurality of basic units of the first transmission unit transmitted via one of the plurality of lanes used to transmit data from the first device to the second device.

15. The apparatus of claim 13, wherein the manager is further configured to allocate to the first stream at least one of the plurality of basic units of the first transmission unit transmitted via the plurality of lanes used to transmit data from the first device to the second device, and
wherein the port unit is further configured to generate the plurality of additional transmission units transmitted via the plurality of lanes used to transmit data from the first device to the second device.

16. The apparatus of claim 13, wherein the manager is configured to allocate to the first stream said at least one basic unit from the plurality of basic units of the first transmission unit transmitted via a first lane, and to allocate to a second stream at least one other basic unit from a plurality of basic units of a second transmission unit transmitted via a second lane, and
wherein the port unit is further configured to generate a first plurality of additional transmission units transmitted via the first lane, each of the first plurality of additional transmission units comprising a respective plurality of first additional basic units, wherein at least one of the plurality of first additional basic units of each of the first plurality of additional transmission units is allocated to the first stream based on the allocation of the plurality of basic units of the first transmission unit, and to generate a second plurality of additional transmission units transmitted via the second lane, each of the second plurality of additional transmission units comprising a respective plurality of second additional basic units wherein at least one of the plurality of second additional basic units of each of the second plurality of additional transmission units is allocated to the second stream based on the allocation of the plurality of basic units of the second transmission unit.

17. The apparatus of claim 11, wherein, from among the plurality of additional transmission units transmitted during one cycle, at least one transmission unit which is initially transmitted comprises information regarding the allocation.

18. An apparatus for receiving data by a second device from a first device which are connected using an audio/video (AV) interface, the apparatus comprising:
a manager configured to receive information regarding at least one basic unit allocated, in an allocation, to a first stream from a plurality of basic units of a first transmission unit transmitted during one cycle; and
a port unit configured to receive plurality of additional transmission units generated and transmitted by the first device, each of the plurality of additional transmission units comprising a respective plurality of additional basic units, wherein at least one of the plurality of additional basic units of each of the plurality of additional transmission units is allocated to the first stream-based on the received information regarding the allocation of the plurality of basic units of the first transmission unit, and to extract data regarding the first stream from the additional plurality of received transmission units based on the received information,
wherein the allocation is cyclically changeable, and
wherein the plurality of additional transmission units are a plurality of transmission units received in one cycle.

19. The apparatus of claim 18, wherein the received information further comprises information regarding at least one other basic unit allocated to a second stream from the plurality of basic units, and
wherein the manager is further configured to extract data regarding the first stream and data regarding the second stream based on the received information.

20. The apparatus of claim 18, wherein the AV interface comprises a plurality of lanes for allowing bidirectional data transmission.

21. A non-transitory computer readable recording medium having recorded thereon a computer program for executing the method of claim 1.

22. A non-transitory computer readable recording medium having recorded thereon a computer program for executing the method of claim 8.

* * * * *